US012208400B2

(12) United States Patent
Hayes et al.

(10) Patent No.: US 12,208,400 B2
(45) Date of Patent: Jan. 28, 2025

(54) SYSTEMS AND METHODS FOR NON-DESTRUCTIVE ISOLATION, CONCENTRATION, AND DETECTION FOR UNBIASED CHARACTERIZATION OF NANO- AND BIOPARTICLES

(71) Applicants: ARIZONA BOARD OF REGENTS ON BEHALF OF ARIZONA STATE UNIVERSITY, Scottsdale, AZ (US); UNIVERSITY OF UTAH RESEARCH FOUNDATION, Salt Lake City, UT (US)

(72) Inventors: Mark Hayes, Gilbert, AZ (US); Mikhail Skliar, Salt Lake City, UT (US); Marc Porter, Park City, UT (US); Brennan Copp, Columbia, MO (US); Samuel Hayes, Gilbert, AZ (US); Alexis Ramirez, Tempe, AZ (US)

(73) Assignees: ARIZONA BOARD OF REGENTS ON BEHALF OF ARIZONA STATE UNIVERSITY, Scottsdale, AZ (US); UNIVERSITY OF UTAH RESEARCH FOUNDATION, Salt Lake City, UT (US)

( * ) Notice: Subject to any disclaimer, the term of this patent is extended or adjusted under 35 U.S.C. 154(b) by 0 days.

(21) Appl. No.: 18/563,438

(22) PCT Filed: May 25, 2022

(86) PCT No.: PCT/US2022/030856

§ 371 (c)(1),
(2) Date: Nov. 22, 2023

(87) PCT Pub. No.: WO2022/251314

PCT Pub. Date: Dec. 1, 2022

(65) Prior Publication Data

US 2024/0181470 A1 Jun. 6, 2024

Related U.S. Application Data

(60) Provisional application No. 63/192,970, filed on May 25, 2021.

(51) Int. Cl.
*B03C 5/00* (2006.01)
*B03C 5/02* (2006.01)

(52) U.S. Cl.
CPC .............. *B03C 5/005* (2013.01); *B03C 5/026* (2013.01)

(58) Field of Classification Search
None
See application file for complete search history.

(56) References Cited

U.S. PATENT DOCUMENTS 8,906,673 B2 12/2014 Vu et al.
9,341,559 B2 5/2016 Carr et al.
(Continued)

FOREIGN PATENT DOCUMENTS

WO 2022251314 A1 12/2022

OTHER PUBLICATIONS

International Search Report and Written Opinion issued in corresponding PCT Application No. PCT/US2022/030856, mailed Sep. 2, 2022.

(Continued)

*Primary Examiner* — J. Christopher Ball
(74) *Attorney, Agent, or Firm* — Quarles & Brady, LLP

(57) ABSTRACT

The present disclosure provides systems and methods for separating one or more analytes within a fluid mixture, and characterizing and/or detecting properties associated with
(Continued)

the one or more analytes. In some embodiments, the systems provided herein contain a dielectrophoresis device, such as a gradient insulator-based dielectrophoresis device (g-iDEP). The present disclosure provides systems and methods for separating and characterizing analytes using particle or nanoparticle tracking analysis (NTA). NTA offers various advantages because, particle size and concentration can be calculated in real time, allowing label-free and simultaneous characterization and separation of samples with mixed and unknown analytes.

22 Claims, 9 Drawing Sheets

(56) References Cited

U.S. PATENT DOCUMENTS

| | | | |
|---|---|---|---|
| 9,645,070 | B2 | 5/2017 | Stramski et al. |
| 2017/0138899 | A1 | 5/2017 | Itabashi et al. |
| 2019/0168237 | A1 | 6/2019 | Hayes et al. |
| 2021/0140871 | A1 | 5/2021 | Thomson |
| 2022/0152629 | A1 | 5/2022 | Hayes et al. |

OTHER PUBLICATIONS

Arndt, A. L., Larson, B. J. & Hogue, B. G. A Conserved Domain in the Coronavirus Membrane Protein Tail Is Important for Virus Assembly. Journal of Virology 84, 11418-11428, doi:10.1128/jvi.01131-10 (2010).

Corstjens, H., Billiet, H. A. H., Frank, J. & Luyben, K. Variation of the pH of the background electrolyte due to electrode reactions in capillary electrophoresis: Theoretical approach and in situ measurement. Electrophoresis 17, 137-143, doi:10.1002/elps.1150170123 (1996).

Crowther, "Refinement of insulator-based dielectrophoresis," Analyst, vol. 142, p. 1608, 2017.

Dent, S. & Neuman, B. W. Purification of coronavirus virions for Cryo-EM and proteomic analysis. Methods Mol Biol 1282, 99-108, doi:10.1007/978-1-4939-2438-7_10 (2015).

Ding, J., Lawrence, R. M., Jones, P. V., Hogue, B. G. & Hayes, M. A. Concentration of Sindbis virus with optimized gradient insulator-based dielectrophoresis. Analyst 141, 1997-2008, doi:10.1039/c5an02430g (2016).

Dragovic, "Sizing and phenotyping of cellular vessicles using Nanoparticle Tracking Analysis," Nanomedicine: Nanotechnology, Biology, and Medicine, vol. 7, pp. 780-788, 2011.

Dwyer, Jason and Hayes, Mark, Sensitive and Selective All-Electronic Chemical and Biological Sensors for Smart Cities and Broadened Monitoring Capacities , Grant Application, 2021.

Hyler, A. R., Hong, D., Davalos, R. V., Swami, N. S. & Schmelz, E. M. A novel ultralow conductivity electromanipulation buffer improves cell viability and enhances dielectrophoretic consistency. Electrophoresis 42, 1366-1377, doi:10.1002/elps.202000324 (2021).

Jones, P. V., & Hayes, M. A. (2015). Development of the resolution theory for gradient insulator-based dielectrophoresis. Electrophoresis, 36(9-10), 1098-1106.

Jones, P. V., Huey, S., Davis, P., McLemore, R., McLaren, A., & Hayes, M. A. (2015). Biophysical separation of *Staphylococcus epidermidis* strains based on antibiotic resistance. Analyst, 140(15), 5152-5161.

Karawdeniya, B. I., Bandara, Y. N. D., Nichols, J. W., Chevalier, R. B., & Dwyer, J. R. (2018). Surveying silicon nitride nanopores for glycomics and heparin quality assurance. Nature communications, 9(1), 3278.

Ke, Z. et al. Structures and distributions of SARS-CoV-2 spike proteins on intact virions. Nature 588, 498-502, doi:10.1038/s41586-020-2665-2 (2020).

Leibowitz, J., Kaufman, G. & Liu, P. Coronaviruses: propagation, quantification, storage, and construction of recombinant mouse hepatitis virus. Curr Protoc Microbiol Chapter 15, Unit 15E. 11, doi:10.1002/9780471729259.mc15e01s21 (2011).

Liu, C. et al. The Architecture of Inactivated SARS-CoV-2 with Postfusion Spikes Revealed by Cryo-EM and Cryo-ET. Structure 28, 1218-1224.e1214, doi:10.1016/j.str.2020.10.001 (2020).

Malvern Instruments Worldwide, "Fluorescence Nanoparticle Detection using NanoSight NTA," Malvern Instruments Limited, 2017.

Malvern, "NanoSight LM10 NTA Software Guide," 2014.

Markx, G. H., Dyda, P. A. & Pethig, R. Dielectrophoretic separation of bacteria using a conductivity gradient. Journal of Biotechnology 51, 175-180 (1996).

Mueller, C., Harb, M., Dwyer, J. R., & Miller, R. D. (2013). Nanofluidic cells with controlled pathlength and liquid flow for rapid, high-resolution in situ imaging with electrons. The Journal of Physical Chemistry Letters, 4(14), 2339-2347.

Nelson et al., 3D Printing Microfluidic Device for Dielectrophoretic Nanoparticle Separation by Size, Poster, Mar. 26, 2019.

Nelson, Label-Free Visualization of Nanoparticles Subjected to Dielectrophoretic Forces, Honors Thesis, Apr. 2019 (public disclosure date Aug. 17, 2020).

Neuman, B. W., Adair, B. D., Yeager, M. & Buchmeier, M. J. Purification and electron cryomicroscopy of coronavirus particles. Methods Mol Biol 454, 129-136, doi:10.1007/978-1-59745-181-9_12 (2008).

Pysher, M. D. & Hayes, M. A. Electrophoretic and dielectrophoretic field gradient technique for separating bioparticles. Analytical Chemistry 79, 4552-4557 (2007).

Staton, S. J. R., Chen, K. P., Taylor, T. J., Pacheco, J. R. & Hayes, M. A. Characterization of particle capture in a sawtooth patterned insulating electrokinetic microfluidic device. Electrophoresis 31, 3634-3641 (2010).

ThermoFisher Scientific, "QDot 655 Streptavidin Conjugate," Thermo Fisher Scientific, [Online]. Available: https://thermofisher.com/order/catalog/product/Q10121MP. [Accessed Apr. 16, 2019].

Turonova, B. et al. In situ structural analysis of SARS-CoV-2 spike reveals flexibility mediated by three hinges. Science 370, 203-208, doi: 10.1126/science.abd5223 (2020).

Venkatagopalan, P., Daskalova, S. M., Lopez, L. A., Dolezal, K. A. & Hogue, B. G. Coronavirus envelope (E) protein remains at the site of assembly. Virology 478, 75-85, doi:10.1016/j.virol.2015.02.005 (2015).

Verma, S., Lopez, L. A., Bednar, V. & Hogue, B. G. Importance of the penultimate positive charge in mouse hepatitis coronavirus A59 membrane protein. Journal of Virology 81, 5339-5348, doi:10.1128/jvi.02427-06 (2007).

Weiss, "Dielectrophoretic mobility determination in DC insulator-based dielectrophoresis," Electrophoresis, vol. 32, pp. 2292-2297, 2011.

White, T. C., Yi, Z. P. & Hogue, B. G. Identification of mouse hepatitis coronavirus A59 nucleocapsid protein phosphorylation sites. Virus Research 126, 139-148, doi:10.1016/j.virusres.2007.02.008 (2007).

SYSTEMS AND METHODS FOR NON-DESTRUCTIVE ISOLATION, CONCENTRATION, AND DETECTION FOR UNBIASED CHARACTERIZATION OF NANO- AND BIOPARTICLES

CROSS-REFERENCE TO RELATED APPLICATIONS

This application is a 371 application of PCT/US2022/030856 filed May 25, 2022, which is based on, claims benefit of, and claims priority to U.S. Application No. 63/192,970 filed on May 25, 2021, all of which are hereby incorporated by reference herein in their entirety for all purposes.

STATEMENT REGARDING FEDERALLY SPONSORED RESEARCH

Not applicable.

BACKGROUND

In the last several years the exploitation of microfluidics as a method for analyte manipulation has grown rapidly, particularly for biological samples. This is driven by the current limitations of diagnostic methods, especially the need for large sample volumes, lengthy analysis times, and low resolution/sensitivity. Microfluidic devices have the potential to improve each of these figures of merit and provide for easy portability and the use on a wide range of analytes including bioparticles. Among the latter class: animal cells, organelles, proteins, vesicles, RNA, glycans, exosomes, lipids DNA and bacteria have been probed.

One major division of microfluidics uses electrokinetic (EK) and the dielectrophoretic (DEP) forces on particles (molecules are considered particles for the purposes of this discussion). The EK forces allows for the manipulation of both the particle and the suspending medium, as it is the sum of electrophoresis and electroosmosis. DEP is the force that is exerted on a polarizable particle present in a non-uniform electric field $\vec{E}$ Utilizing EK and DEP forces, trapping and streaming of particles is possible. This allows for the separation of analytes based on their specific and subtle electrical physical properties.

Previous work on DEP separations has utilized electrode-based dielectrophoresis (eDEP) for separations, which has the advantage of being able to induce high field gradients with a low applied voltage. Fabrication of eDEP devices is difficult and expensive, which is made worse as electrodes are easily fouled, rendering the channels non-reusable. The electrodes cause further issues as electrolysis-created bubbles and the high gradients are only local to the electrodes. DEP devices provide a method for separating a complex sample matrix into individual components. Although current DEP devices may separate a complex sample matrix into individual components with high selectivity, existing devices do not include integrated techniques to characterize the separated bioparticles.

SUMMARY OF THE DISCLOSURE

In some aspects, the present disclosure provides a system. The system includes an insulator-based dielectrophoresis device that includes (i) a fluid flow channel having at least one fluid inlet and at least one fluid outlet; (ii) at least one insulating flow structure positioned in the fluid flow channel that defines a constriction; (iii) electrodes in electrical communication with the at least one fluid channel inlet and the at least one fluid outlet of the fluid flow channel, wherein the electrodes are positioned to generate a spatially non-uniform electric field across the insulating flow structure of the fluid flow channel to exert a dielectrophoretic force on one or more analytes suspended in the fluid within the fluid flow channel; and (iv) a power supply connected to each of the electrodes to generate an electric field within the fluid flow channel. The system further includes a light source having an output beam path configured to irradiate the one or more analytes in the fluid flow channel. The system further includes an optical device comprising at least one photon detector configured to acquire light scattered or emitted by the one or more analytes. The system further includes a processor in electrical communication with the power supply, the light source, and the optical device, where the processor is programmed to apply, using the power supply, a voltage to the electrodes sufficient to separate the one or more analytes in the fluid flow channel and capture at least a portion of the one or more analytes at a trapping zone within the fluid flow channel. The processor is further programmed to irradiate, using the light source, the one or more analytes in the trapping zone with light from the light source. The processor is further programmed to detect, using the optical device, light scattered or emitted by the one or more analytes in the trapping zone and generate a measurement indicative of the one or more analytes.

In one embodiment of the system, the one or more analytes is selected from micro-organisms, amino acids, peptides, proteins, glycoproteins, nucleotides, nucleic acid molecules, carbohydrates, lipids, lectins, cells, viruses, viral particles, bacteria, organelles, spores, protozoa, yeasts, molds, fungi, pollens, diatoms, toxins, biotoxins, hormones, steroids, immunoglobulins, antibodies, supramolecular assemblies, ligand, quantum dots, extracellular vesicles, and combinations thereof.

In one embodiment of the system, the one or more analytes have an average diameter from 10 to 250 nanometers. In one embodiment of the system, the one or more analytes have an average diameter from 10 to 50 nanometers. In one embodiment of the system, the one or more analytes have an average diameter from 10 to 20 nanometers. In one embodiment of the system, the one or more analytes comprises quantum dots.

In one embodiment of the system, the light source includes a visible light source. In one embodiment of the system, the light source includes a laser. In one embodiment of the system, the light source includes a stage surface configured to receive the insulator-based dielectrophoresis device. In one embodiment of the system, the fluid flow channel of the insulator-based dielectrophoresis device defines a first axis, and the output beam path of the light source defines a second axis, and wherein the first axis and the second axis are perpendicular. In one embodiment of the system, the at least one photon-detector includes a camera, wherein the camera is a charge-coupled device (CCD) detector or a complementary metal-oxide-semiconductor (CMOS) detector. In one embodiment of the system, the camera detects light scattered by the one or more analytes. In one embodiment of the system, the camera comprises at least one fluorescent filter and detects light emitted from the one or more analytes.

In one embodiment of the system, the processor is further programmed to apply the voltage using direct current, alternating current, or a combination thereof. In one embodiment of the system, the processor is further programmed to apply a voltage using direct current to separate the one or more analytes in the fluid flow channel and capture at least a portion of the one or more analytes at a trapping zone within the fluid flow channel, wherein the voltage is at least 350 volts, or wherein the voltage is from 500 volts to 1500 volts.

In one embodiment of the system, the processor is further programmed to apply a voltage using alternating current to separate the one or more analytes in the fluid flow channel, wherein the voltage is at least 100 V, or wherein the voltage is from 100 V to 1500 V.

In one embodiment of the system, the measurement indicative of the one or more analytes is a concentration of the one or more analytes in the fluid flow channel. In one embodiment of the system, the measurement indicative of the one or more analytes is a particle size measurement of the one or more analytes.

In one embodiment of the system, the constriction has a dimension from 1 μm to 150 μm.

In some aspects, the present disclosure provides a method. The method includes (i) transporting a fluid mixture comprising one or more analytes through a system comprising: an insulator-based dielectrophoresis device comprising: (a) a fluid flow channel having at least one fluid inlet and at least one fluid outlet, (b) at least one insulating flow structure positioned in the fluid flow channel that defines a constriction; (c) electrodes in electrical communication with the at least one fluid channel inlet and the at least one fluid outlet of the fluid flow channel, wherein the electrodes are positioned to generate a spatially non-uniform electric field across the insulating flow structure of the fluid flow channel to exert a dielectrophoretic force on the one or more analytes suspended in the fluid within the fluid flow channel; a light source having an output beam path configured to irradiate the one or more analytes in the fluid flow channel; an optical device comprising at least one photon detector configured to acquire light scattered or emitted by the one or more analytes; a power supply connected to each of the electrodes to generate an electric field within the fluid flow channel; (ii) applying, using the power supply, a voltage to the electrodes sufficient to separate the one or more analytes in the fluid flow channel and capture at least a portion of the one or more analytes at a trapping zone within the fluid flow channel; (iii) irradiating, using the light source, the one or more analytes in the trapping zone with light from the light source; and (iv) detecting, using the optical device, light scattered or emitted by the one or more analytes in the trapping zone and generate a measurement indicative of the one or more analytes.

In one embodiment of the method, the one or more analytes is selected from micro-organisms, amino acids, peptides, proteins, glycoproteins, nucleotides, nucleic acid molecules, carbohydrates, lipids, lectins, cells, viruses, viral particles, bacteria, organelles, spores, protozoa, yeasts, molds, fungi, pollens, diatoms, toxins, biotoxins, hormones, steroids, immunoglobulins, antibodies, supramolecular assemblies, ligand, quantum dots, extracellular vesicles, and combinations thereof.

In one embodiment of the method, the one or more analytes have an average diameter from 10 to 250 nanometers. In one embodiment of the method, the one or more analytes have an average diameter from 10 to 50 nanometers. In one embodiment of the method, the one or more analytes have an average diameter from 10 to 20 nanometers. In one embodiment of the method, the one or more analytes comprise quantum dots. In one embodiment of the method, the one or more analytes comprise a virus.

In one embodiment of the method, the light source includes a visible light source. In one embodiment of the method, the light source includes a laser. In one embodiment of the method, the light source includes a stage surface configured to receive the insulator-based dielectrophoresis device. In one embodiment of the method, the fluid flow channel of the insulator-based dielectrophoresis device defines a first axis, and the output beam path of the light source defines a second axis, and wherein the first axis and the second axis are perpendicular.

In one embodiment of the method, the at least one photon-detector includes a camera, wherein the camera is a charge-coupled device (CCD) detector or a complementary metal-oxide-semiconductor (CMOS) detector. In one embodiment of the method, the camera detects light scattered by the one or more analytes. In one embodiment of the method, the camera comprises at least one fluorescent filter and detects light emitted from the one or more analytes.

In one embodiment of the method, the voltage is applied using direct current, alternating current, or a combination thereof. In one embodiment of the method, the voltage is applied using direct current to separate the one or more analytes in the fluid flow channel and capture at least a portion of the one or more analytes at a trapping zone within the fluid flow channel, wherein the voltage is at least 350 volts, or wherein the voltage is from 500 volts to 1500 volts.

In one embodiment of the method, the voltage is applied using alternating current to separate the one or more analytes in the fluid flow channel, wherein the voltage is at least 100 V, or wherein the voltage is from 100 V to 1500 V.

In one embodiment of the method, the measurement indicative of the one or more analytes is a concentration of the analytes in the fluid flow channel. In one embodiment of the method, the measurement indicative of the one or more analytes is a particle size measurement of the one or more analytes.

In one embodiment of the method, the constriction has a dimension from 1 μm to 150 μm.

These and other advantages and features of the present invention will become more apparent from the following detailed description of the preferred aspects of the present invention when viewed in conjunction with the accompanying drawings.

DETAILED DESCRIPTION

Figure 1:
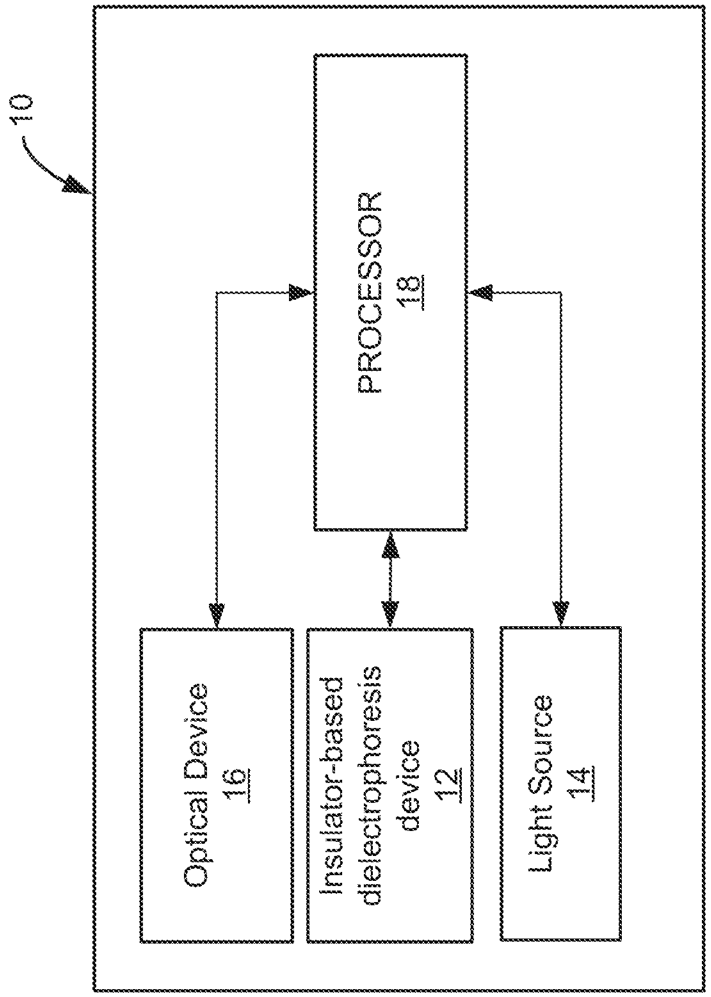
FIG. 1 is a schematic illustration of a system for separating and characterizing an analyte from a fluid mixture in accordance with some embodiments of the present disclosure.

Before the present disclosure is described in further detail, it is to be understood that the invention is not limited to the particular embodiments described. It is also to be understood that the terminology used herein is for the purpose of describing particular embodiments only, and is not intended to be limiting. The scope of the present invention will be limited only by the claims. As used herein, the singular forms "a", "an", and "the" include plural embodiments unless the context clearly dictates otherwise.

It should be apparent to those skilled in the art that many additional modifications beside those already described are possible without departing from the inventive concepts. In interpreting this disclosure, all terms should be interpreted in the broadest possible manner consistent with the context. Variations of the term "comprising" should be interpreted as referring to elements, components, or steps in a non-exclusive manner, so the referenced elements, components, or steps may be combined with other elements, components, or steps that are not expressly referenced. Embodiments referenced as "comprising" certain elements are also contemplated as "consisting essentially of" and "consisting of" those elements.

In some embodiments, the present disclosure provides systems and methods for separating a first analyte from at least a second analyte within a fluid mixture, and characterizing and/or detecting properties associated with at least the first analyte. In some embodiments, the systems provided herein contain a dielectrophoresis device, such as a gradient insulator-based dielectrophoresis device (g-iDEP). The present disclosure provides systems and methods for separating and characterizing analytes using particle or nanoparticle tracking analysis (NTA). NTA offers various advantages because, particle size and concentration can be calculated in real time, allowing label-free and simultaneous characterization and separation of samples with mixed and unknown analytes.

As used herein, the term "Dielectrophoresis" (hereinafter "DEP"), is an electrodynamic transport mechanism with a nonlinear dependence on electric field. A non-uniform electric field produces an unequal electrodynamic force on the charges of a particle producing a net movement of the particle toward the region of higher electric field gradient. The resulting motion is called dielectrophoresis and can occur in either direct (hereinafter "DC"), alternating (hereinafter "AC") electric fields, or a combination of both AC and DC. Insulator-based dielectrophoresis (iDEP) is an alternative to conventional electrode-based dielectrophoresis (eDEP) systems. In iDEP, insulating structures are used to generate nonuniform electric fields. iDEP method differs from traditional DEP separation in that a voltage, created by either DC, AC, or a combination of DC and AC, is applied to electrodes located in remote inlet and outlet reservoirs and the field nonuniformities are generated by arrays of insulating posts located within the channel.

iDEP offers several advantages compared with traditional DEP. The use of remote electrodes avoids many of the problems associated with embedded electrodes, such as electrochemical reactions and bubble generation at the electrode surfaces. Additionally, the use of DC voltages in eDEP creates many issues, which are not encountered in iDEP. The use of a DC field can be advantageous because it can be used to drive both electrophoretic and dielectrophoretic transports, allowing greater control over particle movement.

Figure 2:
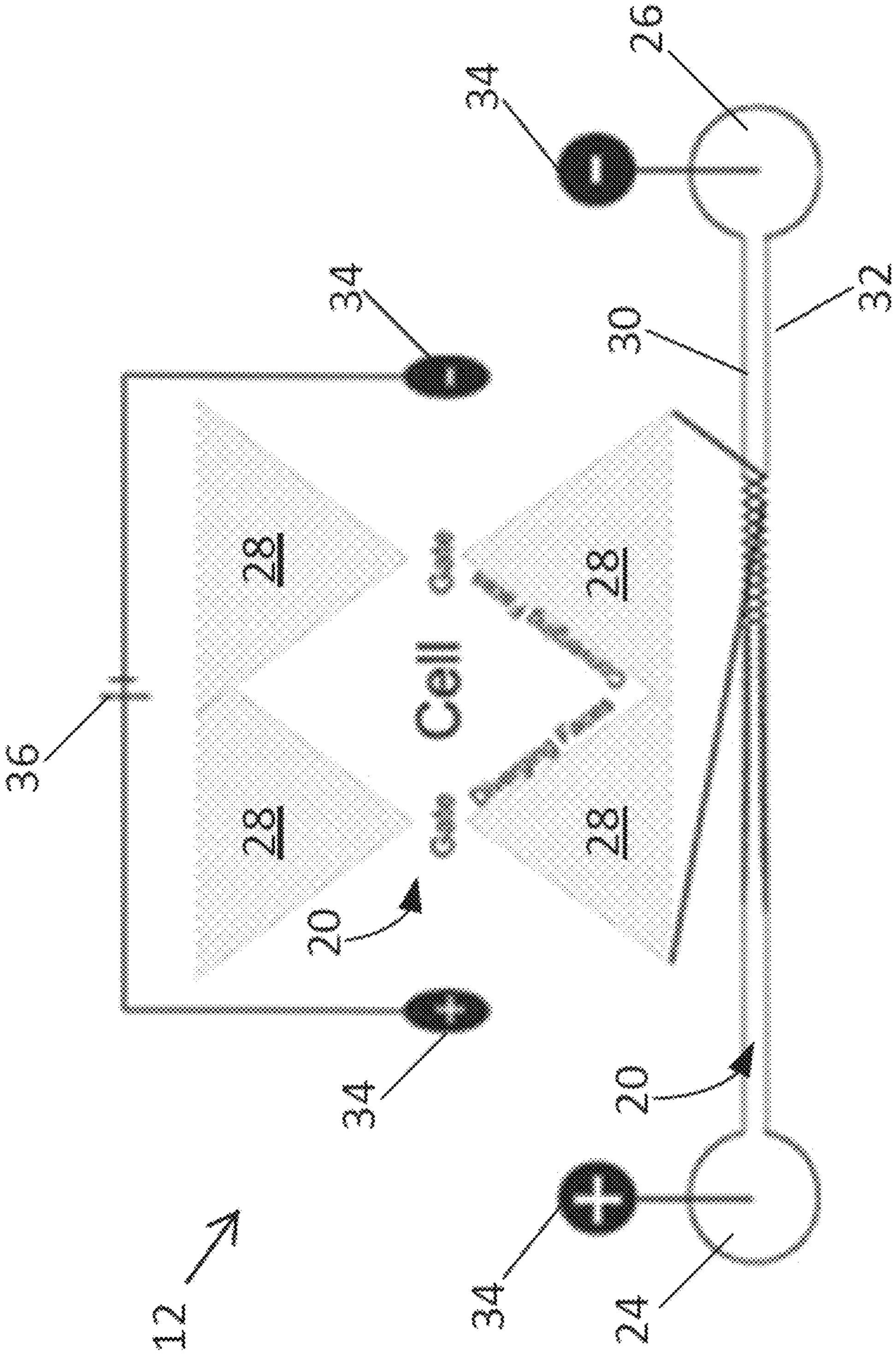
FIG. 2 is a schematic illustration of an insulator-based dielectrophoresis device (iDEP) in accordance with some embodiments of the present disclosure.
Figure 3:
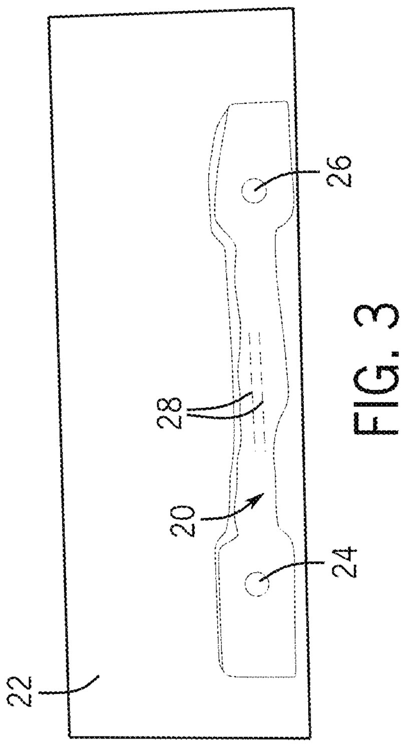
FIG. 3 shows an example of an insulator-based dielectrophoresis device disposed on a substrate in accordance with some embodiments of the present disclosure.

Referring to FIGS. 1-3, the present invention provides a system 10 that includes an insulator-based dielectrophoresis ("iDEP") device 12 for separating at least one analyte from a fluid mixture, at least one light source 14 having an output beam path configured to irradiate analytes in a fluid flow path of the iDEP device 12, an optical device 16 including at least one photon detector configured to acquire light scattered or emitted by the one or more analytes in the iDEP device 12, and a processor 18 in electrical communication with the iDEP device 12, the at least one light source 14, and the optical device 16.

Referring to FIG. 2, an iDEP device 12 is illustrated in accordance with some embodiments of the present disclosure. The iDEP device 12 comprises one or more fluid flow channel 20, which may be disposed on a substrate 22. The fluid flow channel 20 comprises at least one fluid inlet 24 and at least one fluid outlet 26. The fluid flow channel 20 includes at least one insulating flow structure 28. In some embodiments, the at least one insulating flow structure 28 defines a constriction or gate within the fluid flow channel 20.

In some embodiments, the iDEP device 12 includes electrodes 34 in electrical communication with the at least one fluid channel inlet 24 and the at least one fluid outlet 26 of the fluid flow channel 20. The electrodes 34 may be positioned to generate a spatially non-uniform electric field across the insulating flow structure 28 of the fluid flow channel 20 to exert a dielectrophoretic force on analytes suspended in the fluid within the fluid flow channel 20. In some embodiments, the iDEP system 12 includes a power supply 36 connected to each of the electrodes 34 to generate an electric field within the fluid flow channel 20.

As used herein, the term "gate" or "constriction" refers to a spacing between the insulating flow structures 28. In some embodiments, the constriction is a micropore having a dimension (e.g., diameter or width) of no more than 1 mm, or no more than 750 μm, or no more than 500 μm, or no more than 250 μm, or no more than 100 μm, or no more than 50 μm wide in diameter, or no more than 40 μm wide in diameter, or no more than 30 μm wide in diameter, or no more than 20 μm wide in diameter, or no more than 10 μm wide in diameter, or no more than 1 μm. In some embodiments, the micropore may have a dimension from 1 μm to 1 mm. In some embodiments, the pore is a nanopore having a dimension (e.g., diameter) of no more than 1 μm, or no more than 750 nm, or no more than 500 nm, or no more than 250 nm, or no more than 100 nm in diameter, or no more than 50 nm wide in diameter, or no more than 40 nm wide in diameter, or no more than 30 nm wide in diameter, or no more than 20 nm wide in diameter, or no more than 10 nm wide in diameter.

In some embodiments, the constriction tapers along the length of the fluid flow channel 20. In some embodiments, the constriction is a micropore that tapers from 150 μm at the opening of the channel to 1 μm at the outlet of the channel. For example, a first portion of the constrictions may have a dimension that ranges from 150 μm to 50 μm, a second portion of the constrictions may have a dimension that ranges from 50 μm to 30 μm, and a third portion of the constrictions may have a dimension that ranges from 30 μm to 1 μm.

As used herein, the term "channel" refers to a structure wherein a fluid may flow. A channel may be a capillary, a conduit, a chamber, a strip of hydrophilic pattern on an otherwise hydrophobic surface wherein the fluid mixture is confined. In some instances, the channel may be a microchannel or a nanochannel. In some embodiments, the device or system is a microfluidic device having one or more fluidic channels that are generally fabricated at the millimeter to nanometer scale.

In some embodiments, the fluid flow channels 20 are "microfluidic channels" or alternatively referred to herein as "microchannels." Microchannels generally have cross-sectional dimensions below 1 mm, or ranging from 1000 nm to 1 mm. In some embodiments, the microchannel have a cross-sectional dimension of at least 1 μm, or at least 250 μm, or at least 500 μm, to less than 750 μm, or less than 1 mm. The dimensions of the microchannels are dependent on the desired effect on the analyte. As provided herein, the microfluidic channels may be formed in a substrate made of insulating material(s), such as polymers, glass, and the like.

In some embodiments, fluid flow channel 20 are "nanofluidic channels" or alternatively referred to herein as nanochannels. Nanochannels generally have cross-sectional dimensions below 1 μm, or ranging from 3 nm to 1 μm, or from 3 nm to 500 nm, or from 3 nm to 100 nm. In some embodiments, the microchannel have a cross-sectional dimension of at least 3 nm, or at least 10 nm, or at least 100 nm, or at least 250 nm, or at least 500 nm, to less than 750 nm, or less than 1 μm. The dimensions of the nanochannels are dependent on the desired effect on the analyte.

As used herein, "analyte" is used interchangeably with "particle" to refer to a particle that may be natural, synthetic chemicals, inorganic particles, or biological entities (biomolecules, bioparticles).

Suitable natural or synthetic chemicals or biological entities can include, but are not limited to, for example, microorganisms, amino acids, peptides, proteins, glycoproteins, nucleotides, nucleic acid molecules, carbohydrates, lipids, lectins, cells, viruses, viral particles, bacteria, organelles, spores, protozoa, yeasts, molds, fungi, pollens, diatoms, toxins, biotoxins, hormones, steroids, immunoglobulins, antibodies, supramolecular assemblies, ligands, catalytic particles, zeolites, and the like, biological and chemical agents, drugs, prodrugs and metabolites, and the like, magnetic particles, high-magnetic-permeability particles, deuterated compounds, metal ions, metal ion complexes, inorganic ions, inorganic ion complexes, isotopes, organometallic compounds, metals including aluminum, arsenic, cadmium, chromium, selenium, cobalt, copper, lead, silver, nickel, and mercury, and the like, industrial polymers, powders, latexes, emulsions, colloids, environmental pollutants, pesticides, insecticides.

In some embodiments, the analyte may be a cell, for example, a human cell, for example a blood cell or a stem cell or progenitor stem cells. In some embodiments, the present device may be used to separate out differentiating stem cells from a culture.

In some embodiments, the methods and devices of the present invention may be used to isolate and concentrate stem cells based on their progenitor stage (i.e. at different stages of differentiation).

In other embodiments, the analyte may be a bacteria. In some embodiments, the separation of different bacterial strains or serotypes is contemplated. For example, in one example, the ability to isolate resistant versus susceptible bacteria to a specific antibiotic is contemplated.

In other embodiments, the analyte may have a crystalline structure, for example a crystalline structure in a composition derived from crystal growing and used in crystallography.

In some embodiments, the analyte has a diameter or an average diameter from 10 to 250 nanometers, or from 10 to 50 nanometers, or from 10 to 20 nanometers. In some embodiments, the analyte is or comprises quantum dots.

In some embodiments, the system 10 is used to separate at least one analyte from a fluid. As used herein, "separating" refers to removing a given analyte from its initial environment which may include removing analytes of one or more species of interest from analytes of different or other species. In some embodiments, one type of analyte may be separated from another type (e.g., a second, distinct analyte or an analyte having a different property). In some embodiments, more than two analytes can be separated. In some embodiments, the method involves separating the one or more analytes from contaminants or other debris within the fluid. In some embodiments, methods of using the device to separate one or more cell types from another is contemplated. In some embodiments, methods of isolating progenitor stem cells for each other is contemplated. In some embodiments, the provided systems and methods may separate a mixture having a single analyte based on differences in a property of the analyte, e.g., proteins may be separated based on differing three-dimensional folding structures, extracellular vesicles may be separated by size and composition, and DNA molecules may be separated on methylations.

In some embodiments, the system 10 may be used to concentrate at least one analyte. As used herein, "concentrating" refers to the reduction of fluid volume per particle/analyte in the fluid. The methods and devices of the present invention allow a fluid to be concentrated or diluted. When the methods and devices are used to concentrate a fluid, it is noted that particles in one portion of the fluid becomes "concentrated" and that particles in the second portion of the fluid becomes "diluted."

In some embodiments, the at least one insulating flow structure 28 is configured to selectively separate a first analyte from the fluid, and allows passage of a second analyte. In some embodiments the iDEP device 12 includes a plurality of insulating flow structures 28 within the fluid flow channel 20, where each of the insulating flow structures 28 are configured to form a constriction in the fluid flow channel 20. In some embodiments, the number of insulating flow structures 28 are determined by the number of analytes to be separated. In some embodiments, the insulator-based dielectrophoresis devices includes at least 2 insulating flow structures 28, or at least 3, or at least 4, or at least 5, or at least 10, or less than 15, or less than 20, or less than 30, or less than 40, or less than 50, or more.

In some embodiments, the insulating flow structure 28 is composed of an insulating material, such as a polymer (e.g., PDMS), glass, silicon, or combinations thereof.

In some embodiments, the system 10 comprises an insulating flow structure 28 comprises a multi-length scale structure. This multi-length scale structure provides improved resolution and separation of analytes. In some embodiments, the multi-length scale structure comprises an elliptically-shaped base insulator and small elliptically shaped insulators (projections) across part of the elliptically-shaped base. The size of the multi-length scale insulators is dependent on the size of the microchannel. In some embodiments, the small elliptically shaped insulators are 50 nm to 50 μm tall and/or wide at the base and as small as 5 nm wide at the top.

In some embodiments, the small elliptically shaped insulators cover part of the first wall 30 and/or second wall 32. In some embodiments, "part" of the walls 30, 32 is at least 1-100% of the walls 30, 32, more preferably a little less than half (35-45%) of the surface of the walls 30,32. The shape is not limited to ellipses and can include, but is not limited to: circles, triangles, rectangles, and so forth. Additionally, any combination of these can also be used.

In some embodiments, the multi-length scale structure comprises a base structure in a shape selected from the group consisting of circles, ellipses, rectangles, squares, triangles, and curves, including an inverse 20×curve. In some embodiments, the base structure is covered with insulators (projections) that are of a shape selected from the group consisting of circles, ellipses, rectangles, squares, triangles, and curves, including an inverse 20×curve.

In some embodiments, the multi-length scale structure provides improved particle streamlines, improved separation and improved resolution of analytes. In some embodiments, the structures reduce and/or eliminate extraneous trapping zones.

As used herein, "trapping zone" describes the point in the fluid flow channel 20 where analytes of interest are stationary as a balance point between electrokinetic force and dielectrophoretic force. The "trapping zone" can also be described when a particle's velocity along the field line is zero. This leads to trapping occurring when the ratio of the electrokinetic and dielectrophoretic mobilities is greater than or equal to the ratio of the gradient of the electric field squared to the electric field, $$\frac{\nabla|\vec{E}|}{E^2}\cdot\vec{E}\geq\frac{\mu_{EK}}{\mu_{DEP}}.$$

As shown in FIG. 2, "trapping" may be induced by the structure of the at least one insulating flow structure.

In some embodiments, the system 10 using the multi-length scale structure provides a high $\nabla|\vec{E}|^2$ as to provide enhanced resolution of analytes. The $\nabla|\vec{E}|^2$ may range between $10^{12}$ and $10^{23}$ $V^2/m^3$. The $\nabla|\vec{E}|^2$ to influence particles behavior depends on the size of the one or more analytes of interest. Lower $\nabla|\vec{E}|^2$ are able to influence the larger particles (~1-50 μm), while higher $\nabla|\vec{E}|^2$ may influence smaller particles (~10-1000 nm).

Figure 4:
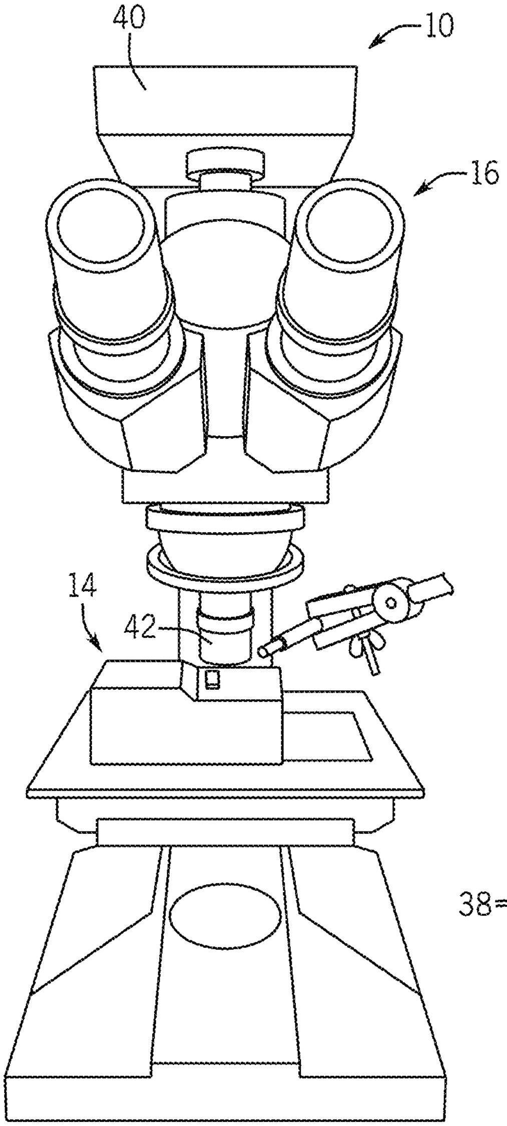
FIG. 4 shows an example of a system having an iDEP device, a light source, and an optical device in accordance with some embodiments of the present disclosure.

Referring to FIG. 4, an exemplary system 10 is shown that comprises the iDEP device 12, the at least one light source 14, and the optical device 16. In some embodiments, the at least one light source 14 includes a device that can emit coherent (e.g., a laser) or incoherent light. In some embodiments, the light source 14 is configured to irradiate analytes in the fluid flow channel 20. The light source 14 may change the angle of irradiation to focus on specific regions in the fluid flow channel 20, e.g., trapping zones. In one non-limiting example, the light source 14 is a NanoSight LM 10 405 nm blue laser device provided by Malvern Panalytical.

Figure 5:
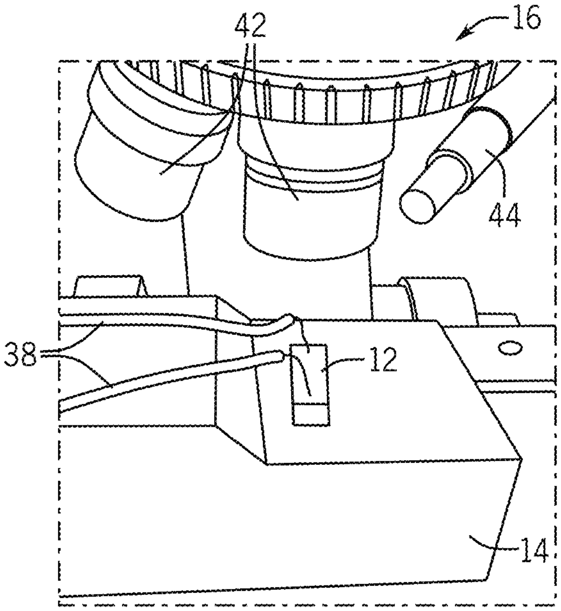
FIG. 5 shows the iDEP device and the light source from FIG. 4.

Referring to FIG. 5, in some embodiments, the light source 14 includes a stage surface configured to receive the iDEP device 12. The fluid flow channel 20 of the iDEP device 12 may define a first axis that is configured to be perpendicular to a second axis defined by the output beam path of the light source 14. Alternatively, the first axis may be arranged parallel to the second axis.

In some embodiments, the optical device 16 includes at least one photon-detector 40 configured to acquire light scattered or emitted by the one or more analytes. In some embodiments, the optical device 16 is an optical microscope, where one or more scanning objective 42 (e.g., 4×objective and/or 20×objective) that directs acquired light to the one or more photon-detector 40. In some embodiments, the photon detector includes a camera, such as a charge-coupled device (CCD) detector or a complementary metal-oxide-semiconductor (CMOS) detector. The at least one photon-detector 40 may include fluorescence filters that are configured to filter out the excitation wavelength of light produced by the light source so that fluorescence emitted from the one or more analytes may be acquired and processed. In some embodiments, the system 10 includes a white-light source 44 configured to irradiate the iDEP device 12. The white-light source 44 may facilitate visibility of the insulating flow structures 28 during use.

In some embodiments, the system 10 further includes a processor 18 in electrical communication with the iDEP device 12 (e.g., electrodes 34 and power supply 36), the light source 14, and the optical device 16. In some embodiments, the processor 18 is configured to execute instructions stored within a memory to control the iDEP device 12, the light source 14, and the optical device 16 to execute instructions. Exemplary instructions may include instructions for particle or nanoparticle tracking analysis (NTA). In some embodiments, the processor 18 is programed to apply, using the power supply 36, a voltage to the electrodes 34 that is sufficient to separate the one or more analytes in the fluid flow channel and capture at least a portion of the one or more analytes at a trapping zone within the fluid flow channel 20. The processor 18 may apply the voltage using direct current, alternating current, or a combination thereof. The separation pattern of the one or more analytes may be controlled using the applied voltage. For example, the separation pattern may be stationary using direct current, where analytes are separated and specific fractions are captured at trapping zones. Additionally or alternatively, the separation pattern may be transitory using a voltage sweep or a time-dependent change. Transitory separation patterns may be useful for capture, but can be used for identifying analytes based on DEP-induced spatio-temporal patterning.

In some embodiments, the processor 18 is configured to apply a voltage using direct current, where the voltage is at least 350 volts, or at least 400 volts, at least 450 volts, at least 500 volts, at least 600 volts, at least 650 volts, at least 700 volts, at least 750 volts, at least 800 volts, at least 850 volts, at least 900 volts to less than 1000 volts, less than 1100 volts, less than 1200 volts, less than 1300 volts, less than 1400 volts, or less than 1500 volts.

In some embodiments, the processor 18 is configured to apply a voltage using alternating current, where the voltage is at least 100 V, or at least 200 volts, or at least 300 volts, or at least 350 volts, or at least 400 volts, at least 450 volts, at least 500 volts, at least 600 volts, at least 650 volts, at least 700 volts, at least 750 volts, at least 800 volts, at least 850 volts, at least 900 volts to less than 1000 volts, less than 1100 volts, less than 1200 volts, less than 1300 volts, less than 1400 volts, or less than 1500 volts.

The processor 18 is further configured to irradiate, using the light source 14, the one or more analytes in the trapping zone with light from the light source 14. The processor 18 is further configured to detect, using the optical device 16, light scattered or emitted by the one or more analytes in the trapping zone and generate a measurement indicative of the one or more analytes (e.g., particle size and concentration can be calculated in real time).

EXAMPLES

The following Examples will enable one of skill in the art to more readily understand the principles thereof. The following Examples are presented by way of illustration and are not meant to be limiting in any way. The statements provided in the Examples are presented without being bound by theory.

Example 1

The device used in Example 1 is a "sawtooth patterned insulating electrokinetic microfluidic device." The microchannel in the device includes larger areas for injection and exit of buffer/nanoparticle solutions, with some length of narrower, smooth microchannels preceding and following the "sawtooth" section, in which the separation takes place. The device may be fabricated using a variety of methods, including using a mold (photomask) printed onto a silicon wafer in a nanofabrication facility using photolithography. Once this initial mold is made, it can be reused numerous times to fabricate devices using soft lithography. Soft lithography describes a microfluidics fabrication procedure in which the photomask is used to imprint the desired microfluidic geometry on a silicon-containing organic polymer called polydimethylsiloxane (PDMS). Once this polymer is heat-cured, it becomes a stiff, transparent plastic.

Nanoparticle Tracking Analysis:

Particle visualization was achieved using a microscope with fluorescent illumination, with separation by size ascertainable because of different fluorescent labeling for differently sized particles. Recent work has focused on use of nanoparticle tracking analysis (NTA) for visualization, which in several operational modes is label-free. This means that, with proper calibration, nanoparticle size may be calculated based on a particle's Brownian motion without need for fluorescent or other forms of labeling. The NTA instrument is used in a non-standard, non-design configuration. In its fluorescence mode, the NTA instrument can be used for visualization and sizing of fluorescent particles. In this study, inherently fluorescent quantum dots are used. The surfaces of some of these small-diameter gold nanoparticles are functionalized, and differences in capture between functionalized and non-functionalized particles may be observed using NTA.

NTA works by focusing a laser beam of light in the visible spectrum on samples containing nanoparticles which scatter the light due to Raleigh scattering. Raleigh scattering occurs when analyte particles are smaller than the wavelength of light used to illuminate them. By visualizing the light scattered individually by each particle, the particle displacement in the solution can be visualized and quantified. The particle mobility can then be used to obtain its hydrodynamic size by using the Stokes-Einstein relation, which appears as equation (8) in the Theory Section. The configuration of the device in which the motion of the particles is visualized is discussed in Experimental Setup section.

Theory

Dielectrophoresis

According to Coulomb's Law, the vector quantity force f on a charge q is proportional to the direction and magnitude of the electric field surrounding the charge [Ref. 5]:

$$f=qE \tag{1}$$

When this field is nonuniform, as in dielectrophoresis, the force is therefore proportional to the gradient of the electric field. According to the literature [Ref. 6], DEP velocity is given by:

$$u_{DEP}=-\mu_{DEP}\nabla|E|^2 \tag{2}$$

In the case of a spherical particle, force due to DEP is given by [Ref. 6]:

$$F=4\pi\varepsilon_f r_p^3 Re(f_{cm})(E\cdot\nabla)E=2\pi\varepsilon_f r_p^3 Re(v)\nabla E^2 \tag{3}$$

where $\varepsilon_f$ is fluid permittivity, $r_p$ is particle radius, and E is the electric field. $Re(f_{cm})$ is the real part of the Clausius-Mossotti factor defined by particle and fluid conductivities, σ, at low frequency [Ref. 6]:

$$\mathrm{Re}(f_{cm})=\frac{\sigma_p-\sigma_f}{\sigma_p+2\sigma_f}\ \text{when}\ f<100\,\text{kHz} \tag{4}$$

At frequencies greater than 100 kHz, σ are replaced by frequency-dependent permittivities, ε. According to (3), particles not containing a charge must be subjected to a non-uniform electric field and have different conductivity (and permittivity, depending on the frequency) than the fluid in order to experience DEP force.

Currently, work using the sawtooth patterned device, and with iDEP more generally, has focused on direct current (DC). However, some advantages have been identified for use of alternating current (AC) to obtain greater control [Ref. 6]. This Example 1, however, will use exclusively DC power.

The relationship in (3) is insufficient for rigorous quantification of iDEP data but is observed to be true qualitatively. This is due partially to deviations from the assumptions inherent in the relationship given in the equation. Permittivity, particle size and shape, and local field gradients are often not known with certainty, and the equation also assumes that particles are spherical with a permanent or induced dipole [Ref. 6], and the induced dipole with iDEP in a sawtooth device is not constant.

Electrokinetic velocity of particles, a vector quantity, is the sum of electrophoretic and electroosmotic velocities. Since velocity is the product of mobility and the electric field vector:

$$v_{ek}=(\mu_{EO}+\mu_{EP})E \quad (5)$$

where $\mu_{EO}$ is electroosmotic mobility, and $\mu_{EP}$ is electrophoretic mobility [Ref. 6].

Similar to macroscopic flow, flow in the microchannel has terms for advection and diffusion. On the micro-scale, flow is additionally affected by electrokinetic effects. In this Example 1, pressure-driven flow will be assumed negligible, as every attempt will be made experimentally to balance the hydrostatic pressure on each end of the microfluidic device, or to maintain advective (bulk) flow at a constant rate. Particle flow, j, may therefore be described by:

$$j=D\nabla C+C(v_{bulk}+v_{EK}+v_{DEP})\approx D\nabla C+C(v_{EK}+v_{DEP}) \quad (6)$$

where D is the diffusion coefficient and C is particle concentration [Ref. 6].

In the case of the very small quantum dot particles, diffusion effects cannot be completely ignored. However, it is assumed that during DEP, when the electric current is applied to the channel, effects of EK and DEP are much greater than motion due to diffusion that all motion at the time of capture can be assumed to be due to electrokinetic and dielectrophoretic effects. However, since DEP-induced capture introduces large concentration gradients, capture may take longer to achieve and be more difficult to maintain with small particles due to non-trivial diffusion levels.

DEP force occurs most strongly at points of constriction in the microchannel because the highest gradients are induced near those points. In the sawtooth-patterned device, this occurs in the spaces between top and bottom teeth. When particles are not near a constriction and diffusion is neglected because current is flowing, their motion is assumed to be mostly electrokinetic (EK). Trapping, also referred to as capture, occurs when particle velocity is zero. This means that, assuming negligible diffusion, capture occurs when $v_{DEP}=v_{EK}$, that is, when [Ref. 6]:

$$(\mu_{EK}-\mu_{DEP}\nabla|E|^2)\cdot E\leq 0 \quad (7)$$

Brownian Motion and Nanoparticle Tracking Analysis

The Stokes-Einstein equation relates the displacement of molecules and particles due to the Brownian motion to their hydrodynamic size. For Brownian motion in two dimensions, this equation has the following form:

$$\langle x, y\rangle^2 = \frac{K_B T t_s}{3\pi\eta d_h} \quad (8)$$

where $<x, y>^2$ is mean squared displacement, $K_B$ is the Stefan-Boltzmann constant, T is absolute temperature of the solvent, ts is sampling time, $\eta$ is solvent viscosity, and $d_h$ is hydrodynamic diameter [Ref. 7]. In the case of nanoparticle tracking analysis, all these are known except hydrodynamic diameter (particle size), so this equation can be employed to determine particle size depending on displacement of each particle with time. For the 405 nm Malvern NanoSight device used in this Example 1, temperature control is not possible, so the user inputs the solvent temperature (assumed to be ambient). Viscosity is assumed to be the same as that of water at the ambient temperature.

Many factors complicate an NTA instrument's accurate calculation of particle size. One such factor is analyte refractive index. The refractive index of gold nanoparticles is much larger than water, which allows visualization of very small particles [Ref. 7]. However, the size quantification of nanoparticles at the lowest rage of the instrument's capabilities is inevitably susceptible to imaging errors which may be further exaggerated by poorly selected camera and analysis settings. The selection of proper focus and settings will be discussed in the Experimental Setup section of this Example 1.

The gold nanoparticles (high refractive index; assumed to be spherical in shape) used by in this Example 1 is much smaller than the wavelength of the laser light with which they are illuminated and, therefore, scatter the light in the Rayleigh regime [Ref. 7]. Therefore, the amount of light scattering is giving by:

$$\sigma_s = \frac{2\pi^5}{3}\left(\frac{d^6}{\lambda^4}\right)\left(\frac{n^2-1}{n^2+2}\right) \quad (9)$$

where d is particle diameter, $\lambda$ is wavelength of light, and n is ratio of particle refractive index to solvent refractive index [Ref. 7]. Therefore, the amount of scattering is also dependent on particle size. With high refractive index of gold nanoparticles, in may be difficult to find the settings appropriate for simultaneous imaging of both small and large particles, which is another source of potential particle sizing errors and biases towards larger-size particles.

Carefully selected settings can largely eliminate these problems for use of the Malvern NanoSight in its designed configuration, but in Example 1 the distance from the analyte to the microscope aspect has been altered because of the placement of the microfluidic device where the sample chamber usually goes. Additionally, the laser on the NanoSight device is designed to enter this sample chamber at a certain angle and focus on a specific region to which the NanoSight software is calibrated for calculation of particle size. This laser positioning is different every time in the case of a microfluidic device and is ideally focused on teeth of interest within the device.

Additionally, the sample chamber is designed to have negligible depth (as the NTA only calculates two-dimensional displacement), but the channel has small, but potentially significant, depth. This means that, without recalibration of the NanoSight, displacement measurements performed by NTA in order to determine particle size are meaningless when the instrument is used with the microfluidic device.

Experimental Setup

PDMS Device Fabrication

PDMS devices fabricated using a photolithography template were pre-made and already available for use. The device was fabricated for capture of particles by dielectrophoresis and the visualization of that process using NTA. The photolithography template design was made for visualization using a microscope, which meant that the entire length of the channel, including both smooth ends of the channel, both wells, as well as all teeth fit on the stage of the standard microscope and may be seen beneath it. At the current stage of work with NTA visualization, the blue 405 nm laser attachment for the NTA is used because it has an optical flat (stage) that is not metallized and therefore not harmed by introduction of electrolytic solutions on its surface when high voltages are applied. The blue laser's red counterpart, however, although it has a larger stage, has the potential to be damaged in this way. Because there is a high chance that analyte solution will accidentally contact areas beneath the microfluidic device during analysis, the blue laser is therefore used to protect valuable equipment.

A NanoSight device was used to observe capture. The PDMS device was placed atop an optical flat center of the NanoSight device, and has platinum electrodes attached to yellow-jacketed wires, where the platinum electrodes are inserted in wells of the PDMS device. The PDMS is aligned beneath 4×microscope objective, first with eye mode, then with camera. As may be seen in FIG. 5, however, the part of the laser stage on which the sample is placed for the blue laser is inset into the laser device, at a lower level than the rest of the instrument. This, combined with the size of the cover glass available to seal the channel in this example, limits the length of the normally 4 cm-long PDMS device to about 1.5 cm. Although this requires using less than half the original device and therefore the loss of a number of teeth (potential capture sites), this is acceptable for this application because only about three gates (pairs teeth of insulating structures) are able to be visualized at once with NTA with the laser in focus, so the loss of the other gates does not matter.

For this reason, the portion of the device that is used must be carefully selected. It should be noted as well that there are two similar photolithography designs in use, known as V2 Larger and V2 Smaller. As may be assumed from their names, the V2 Larger design has larger features and therefore larger gaps between teeth and is therefore only capable of capturing larger particles. Because the purpose of this example was to capture very small particles, including quantum dots, the V2 Smaller design was the only suitable one for this example.

The V2 Smaller device has 24 gates, and the gaps between them decrease in size with increasing number, so that the smallest particles may be expected to be captured at the lowest voltages at teeth 22-24. The separation distance between the top and bottom teeth (the defining feature for the constriction which causes dielectrophoretic force in the channel), or pitch, for teeth 22-24 is 3 microns.

TABLE 1 shows the V2 Larger Gate separations

| Gate Number | Separation Distance (μm) |
|---|---|
| 1, 2, 3 | 72.83 |
| 4, 5, 6 | 52.00 |
| 7, 8, 9 | 42.69 |
| 10, 11, 12 | 37.11 |
| 13, 14, 15 | 33.29 |
| 16, 17, 18 | 30.46 |
| 19, 20, 21 | 28.26 |
| 22, 23, 24 | 26.48 |
| 25, 26, 27 | 25.00 |

TABLE 2 shows the V2 Smaller Gate separations

| Gate Number | Separation Distance (μm) |
|---|---|
| 1, 2, 3 | 30.00 |
| 4, 5, 6 | 9.35 |
| 7, 8, 9 | 6.36 |
| 10, 11, 12 | 5.01 |
| 13, 14, 15 | 4.22 |
| 16, 17, 18 | 3.69 |
| 19, 20, 21 | 3.30 |
| 22, 23, 24 | 3.00 |

In a fabricated PDMS device, teeth are labeled with these numbers, and the numbers are clearly visible under the microscope if the light source used to generally illuminate the channel is properly positioned. The V2 Smaller device is labeled on its inlet end, which is closest to tooth 1, with one circle on either side of the channel. This indicates the inlet end as well as that the device has the smaller, not the larger features (V2 Larger devices have two circles on the inlet end, but otherwise look very similar to V2 Smaller devices). Because the analyte particles in this Example 1 were so small compared to particles captured consistently in past work, the end of the device with the smaller gate separation distances was used. This is the end of the device without the one-circle label.

In initial experiments using the 405 nm NanoSight laser that required the channel to be cut, the device was fabricated using the method described in the following paragraphs. In this example, some devices were modified from this original design for improved utility in electrode placement and channel visualization.

PDMS Device Modifications.

The devices were cut to the appropriate width and length using scissors and/or an X-Acto knife. Good light is required for this step as it can sometimes be difficult to see the channel in the very clear PDMS. Proper width was easier to achieve than length, as the channel is not nearly as wide as the cover glass on which the PDMS devices were sealed. To cut to the right length, a Corning cover glass slide (22 millimeters on each side) was used as a template. The outlet well end was aligned with the edge of the cover slide, making sure the cover slide would completely seal the channel, but leaving little extra space on that end in order to maximize the number of teeth visible on the opposite end of the channel. The other end of the channel was then cut so that the total length of the channel was very slightly shorter than the length of the cover slide. This made the device was easier to seal onto the cover slide after plasma cleaning.

After cutting, a 2 mm or 3 mm biopsy punch was used to punch a hole in the designated well on the outlet end of the device and a hole on the inlet end, which, in the cut device, has teeth. The hole should be punched as close to the edge of the device as possible, but the well should be completely enclosed, with the punch not in danger of tearing or punching through the edge of the device. The holes on the inlet and outlet ends of the device should be as close to the same volume as possible, so if the original fabricator of the device already punched a hole in the well (outlet) end using a 3 mm biopsy punch, the same size punch should be used on the other end. The hole on the inlet end may be punched slightly off-center as long as fluid can still enter the channel.

Each punch size has advantages and disadvantages. Advantages of the smaller 2 mm size are that the hole on the inlet end of the device (which has nearby teeth) compromises fewer teeth. Also, the electrodes may stay more firmly anchored in the wells, and the liquid volume to fill the wells will be slightly less, which is an advantage if limited amounts of analyte are available. Advantages of the smaller well size are that pressure-driven flow is easier to prevent and electrodes are more mobile, which is useful when aligning the device on the NanoSight stage.

Cleaning was performed thoroughly. The solvents used for cleaning the PDMS device were isopropanol and water, and the cover glass was cleaned with these two solvents as well as acetone. Compressed air was used for drying. Before the devices and cover slides themselves were cleaned, all surfaces of a petri dish or similar container with a lid were cleaned with acetone, isopropanol, and then water. The container was dried with compressed air and never stored face up or uncovered so debris could not enter it from the air. Once this container was ready, PDMS devices and cover slips were ready to be cleaned. A secondary surface, such as a microscope slide larger than the cover slips used for bonding, was also cleaned so that the device could be placed on this clean surface in the plasma cleaner rather than on the dirty plasma cleaner glass. This also protected the expensive plasma cleaner glass.

Cover slides and PDMS devices were either held with the fingers during cleaning or lightly with wide-nosed tweezers. Using sharp-nosed tweezers or putting too much pressure could damage the devices and cover slides, and using tweezers could also make devices and cover slides more prone to being dropped. Both sides of the cover slides and secondary microscope slide were washed with generous volumes of acetone, then isopropanol, and then clean deionized water from standard laboratory spray bottles. It should be ensured that these solvents are relatively clean and in clean containers (not containing many particles) before beginning this process. This can be verified by using the NanoSight in its designed configuration; the procedure for doing this is discussed in section 3.2.

After washing with the three solvents, the cover glass or microscope slide was held in a small beaker of clean deionized water (replaced daily) inside a sonicating bath for a few seconds, then dried completely with compressed air. Kim Wipes cover the surfaces with particles, so their use is not recommended. Once the cover slip or microscope slide was dry, it was placed in the larger container (petri dish) previously cleaned. To clean PDMS devices, the same procedure was followed, except PDMS was not rinsed with acetone, only isopropanol and water, as acetone may be damaging to PDMS. Devices were placed channel-up in the clean petri dish or other transport container. Cleaning several devices at once saves time.

The plasma cleaning and sealing step had the highest chance of failure of any step, but proper cutting and thorough cleaning made the chance for success higher. In the case of this Example 1, which was performed after some previous experience with PDMS device fabrication, all devices were successfully plasma cleaned and sealed to the cover glass. The plasma cleaner used for this Example 1 was a Harrick Plasma PDC-32G. The steps in this part of the process are time sensitive, and were completed as quickly as possible while still maintaining cleanliness. For this step, a few milliliters of clean 0.05 M sodium borate solution (Thermo Scientific Product #28384, BupH™ Borate Buffer Pack, 0.05 M), a 2-10 microliter micropipette along with suitable narrow pipette tips that fit well in the 2mm wells of the channel, a laboratory spatula, silicone sealing material (GE Silicone 2+*CLEAR) available from most hardware stores, and tweezers were needed. A good source of light was also important at this step.

The PDMS was placed channel-up on the secondary microscope slide next to the cleaned cover glass, oriented so it would be easy to place the PDMS on the cover glass when plasma cleaning was complete. The entire secondary slide was placed on the plasma cleaner glass, and all this was put inside the plasma cleaner. The plasma cleaner pump was started, the valve opening the chamber to atmospheric pressure was closed, and the pressure inside the chamber was decreased to less than 500 millitorr according to the gauge. This took about one minute. When the desired pressure had been reached, the plasma cleaner itself was powered on, the switch was turned to "high," and a timer for 25 seconds was started. When time was up, plasma was stopped. Pressure was reintroduced into the chamber relatively gradually to avoid any damage to the PDMS device due to sudden pressure changes.

Once the device was removed from the plasma cleaner, buffer was placed in the sealed channel as soon as possible, preventing the channel from becoming hydrophobic. Because the channel is so narrow, liquid will not enter it at all if it is hydrophobic. The channel-up PDMS was quickly and carefully flipped onto the cover slide so the bond between the cover glass and the plasma-treated PDMS would seal the channel. The PDMS was aligned and centered as much as possible, it was ensured that no PDMS on either the inlet or outlet end was left hanging off the glass. The back of the tweezers was used to press down gently around the edge of channel, but not directly on it to facilitate proper bonding to the cover glass. With proper light, the shape of the channel was clearly visible if this was done properly, indicating a good seal. The most important areas to seal are immediately around the channel. Once those areas were sealed, the next step was begun.

To prevent hydrophobicity, 6-8 microliters of sodium borate buffer was placed in the outlet (well) end of the device using the micropipette. The inlet end (with the teeth) needed to be sealed with silicone before liquid could be placed in its well. The spatula was used to place a small amount of silicone over the open part of the channel on the opposite end of the device. The channel was too small to confirm sealing visually, but placing the silicone over where the channel was seen to end was usually successful. Smearing silicone much further than is required to seal the channel, especially on the bottom of the cover glass or on top of the PDMS, was avoided, as this severely interfered with optics during testing. Once the inlet end had been sealed with silicone, the same volume of sodium borate buffer as that used on the other end was placed in this end as quickly as possible. As long as liquid had not leaked between the PDMS and the glass due to an improper seal, if the channel was no longer visible soon after filling both ends with buffer, this was a sign of successful fabrication (the channel cannot be easily seen visually when it is filled with liquid). It should be noted that in the case of the V2 Smaller device, complete filling of the channel may take 10-15 minutes.

PDMS Device Modification

Throughout this Example 1, the PDMS devices were cut in several different ways to maximize their utility and ability to be visualized on the NanoSight stage. The earliest modification that was made was to make the edges of the device surrounding the channel as narrow as possible, then bond the device as near as possible to one edge of the cover glass. The purpose of this modification was to allow inspection of the entire channel under the main light source on the transparent portion of the optical flat. This allowed the NTA to be used, for inspection purposes, more like a typical microscope. This also limited optical interference with the laser if the device was positioned laterally on the stage, giving more flexibility in how particle movement in the channel was visualized. This will be discussed in more detail in the following section.

Other modifications made to the original device preparation involved preserving all teeth of the device. The devices were originally fabricated by simply being cut in half, which left less than half the teeth, which are the region of interest, with a large portion of the length of the device being consumed by the well and long, smooth channel leading to the teeth. While the device was originally designed with these long, smooth portions of the channel on either end to aid in achieving a balance of hydrostatic pressure in the wells in order to prevent pressure-driven flow during experiments, they have little utility when using the NanoSight blue laser for visualization. Therefore, a device used in this Example 1 was fabricated by cutting both long well ends off and leaving all teeth in the middle. There was enough space on either end of the teeth to punch holes in the channel for wells. In the device prepared this way, only tooth 1 was rendered unusable. This device also had the first modification applied to it, so it was cut to be only just wider than the width of the channel and wells and was bonded as close as possible to one edge of a cover slide.

The third modification made to the original PDMS device design for use with the NanoSight was using the length of the entire channel. As will be discussed in more detail in the following section, in this device it was difficult to align the NanoSight laser along the length of the channel because it is too long to be oriented in that direction on the NanoSight stage. This was the original reason for cutting the devices for use with the NanoSight. However, this device can be used when oriented perpendicular to the laser. Since the cover glass is too short for the entire channel, this device was bonded to a standard microscope slide rather than cover glass. It was again cut to be as narrow as possible around the channel and bonded as close as possible to one edge of the microscope slide. In fact, in this device, the PDMS around the wells is wider than around the rest of the device, since the wells are also wider than the rest of the device. A drawing of this device is shown in FIG. 3.

Nanoparticle Tracking Analysis

NanoSight Standard Configuration

The 405 nm blue laser apparatus set up for use in its designed manner is shown in FIGS. 4 and 5. The sample of interest is prepared in a 1 mL centrifuge tube or larger container. It is recommended that the inside of this container be cleaned thoroughly with acetone, isopropanol, and water, in a similar manner as described for the cover slides in the previous section and dried completely using compressed air. This will reduce the number of foreign particles in the sample. It is also recommended that, in order to avoid contamination, the stock of each analyte never be taken from directly with the syringe to be injected into the NanoSight analysis chamber. Instead, the sample should be prepared in the secondary container previously mentioned. Making too large a sample in this container should also be avoided, because each time the container is opened and contacted with a syringe, there is risk of contamination by more foreign particles.

Once the sample had been prepared in a clean container, it was also ensured that the optical flat and sampling chamber were sufficiently clean. The optical flat was most effectively cleaned by using ethanol on a Kimwipe, and compressed air was used to free the surface of particles left behind by the Kimwipes. The cover of the sampling chamber was also cleaned in a similar way, with care taken to remove as much residue as possible from the glass of its window without risk of scratching or otherwise damaging the surface. Particles were also removed from this part of the device using compressed air. The chamber was assembled with the screws on the corners of the sampling chamber lid tightened finger-tight in an alternating manner so as to achieve a proper seal. The chamber seals best if the edges are not altered by the presence of electrical tape or other obstructions, but it can still be used if these things are present, which they often are if the NanoSight is used in its standard configuration in the midst of experiments with microfluidic devices.

Before tests, a 3 mL syringe with a properly sized outlet end was used to fill and empty the chamber two to three times with clean, fresh deionized water or sodium borate buffer solution. The analyte was then ready to be loaded. Generally, a 1 mL syringe was used for this to preserve as much sample as possible. No more than 0.4 mL of solution is required to fill the entire chamber as well as both inlet and outlet ports, but even less than this is needed to completely fill the chamber itself. However, the chamber fills best with slightly more solution than required in the syringe (or even when using a 3 mL syringe, if possible), presumably because of increased hydrostatic pressure in the syringe.

To fill the chamber, the entire laser apparatus was held at a 45 degree angle, with the inlet port, with the syringe inserted, oriented downward. Slow, even pressure was placed on the syringe plunger, and the liquid was observed as it filled the channel. Ideally, no air should be present in this channel, and if there are bubbles present, it is recommended that the solution be removed by tilting the chamber to be vertically oriented with the syringe down and applying gradual, even pressure to the syringe plunger in the opposite direction. Filling the chamber may then be attempted again. If a particular portion of the chamber has a persistent bubble every time, it is recommended that the seal of the screws, and of the gasket inside the chamber, be verified. First, though, the entire laser apparatus can be tilted in the direction of the bubble during filling to allow gravity to help with the successful filling of the chamber. The chamber may be filled until analyte is visible in the outlet port of the device, but it is not necessary to fill this outlet port completely for a successful reading using NanoSight. A new syringe should be used for every test, and analyte bottles should be dated, with prolonged use being avoided. They should also be open only when necessary to fill the syringe, being resealed immediately after.

Once the chamber is filled, the laser apparatus is placed on the microscope stage with the syringe still inserted into the inlet port. If the syringe is removed, the seal will be broken, and the analyte will not remain in the chamber. The syringe will also be used to remove the analyte at the end of the experiment. The laser is powered on by clicking "Start Camera" in the upper left corner of the NanoSight 3.3 software. The "Capture" tab must be selected in this portion of the screen for this option to be available. Note that the switch to power the instrument on must also be turned on the laser instrument itself for the laser to start. Although the camera runs continuously when the power is on, it is only recording during experiments, and the user of the instrument can push in the silver knob on the upper left side of the microscope eyepiece to view the sample chamber through the microscope eyepiece rather than through the camera. Viewing with the eyepiece is the first step in achieving the right view for particle sizing.

When looking through the microscope eyepiece, the first step is to locate the laser. Because the NanoSight used for this Example 1 has been modified for use with microfluidic devices, it has both a 4×objective and its default 20×objective lens available. The 20×objective is preferably used for particle sizing in the standard configuration, but the 4×objective can be used for initial identification of the laser. Sometimes when initially powered on, the laser is set to a low brightness. This is controlled by the "Camera Level" slider in the upper left corner of the software interface. The laser is easier to identify and focus using the eyepiece, especially in dilute samples, if this camera level is increased to its maximum, 16.

Once the laser is located and centered in the field of view using the 20×objective, the stage can be moved back and forth in the horizontal axis (x) direction to inspect the length of the laser's penetration into the chamber. Upon inspection, a "fingerprint" will be seen on the far left end. This is a large, bright area of the laser, which is where the laser, which is positioned at a shallow angle with the plane of the sampling chamber, emerges through the transparent part of the optical flat to illuminate the central portion of the sampling chamber. The laser is most focused just to the right of the fingerprint, and this is the area which should be focused on during readings in order to achieve proper particle sizing. Once this portion, with the fingerprint not in the field of view, is centered, the gross and fine-tuned z axis adjustment knobs on the microscope are used to achieve a view with a clearly defined laser, ideally with Brownian motion just-visible particles perceptible, although this is not always realistic with very small particles, especially if there is a high level of sample contamination with larger particles.

The view can now be switched to the camera by pulling out the silver knob on the uppermost left of the microscope eyepiece. The view under the microscope should now be visible in the center of the computer screen. This will be slightly offset from the view through the eyepiece and will probably appear more zoomed. The first step is to ensure that the camera field of view is centered on the laser. If the microscope objective lens is positioned properly along the length of the laser, the laser should fill exactly the entire field of view on the screen. The y-axis adjustment or computer cursor is used to scroll up and down to ensure this is the case. The portion being viewed through the camera should also be just to the right of the fingerprint, but the fingerprint should not be visible at all in the field of view.

The z-axis must also be readjusted. The z-axis focus and camera level are two of the important factors in the outcome of a nanoparticle tracking analysis measurement. If the zoom is close to its correct position, Brownian motion of particles should be visualized on screen. The fine z-axis adjustment is used to ensure that these particles can be tracked when data are analyzed. To achieve correct focus, as many particles as possible should be clearly visible while minimizing the number of particles that appear very large due to large amounts of scattering or are surrounded by "halos". It should be noted that the particles used in this Example 1 are very small, close to the lower detection limit of the NanoSight LM10 device, which is 10 nanometers, so further zoom may have been needed to see the particles of interest clearly, making larger contaminant particles out-of-focus or not visible. This is an important reason to maintain as much cleanliness as possible in the analyte solution.

Camera level is also an important factor in obtaining good data in a standard scattering mode or fluorescence reading. The software is equipped with "bright" and "dark" warnings, and a camera level setting should be selected such that the scattering from the smallest particles is still visible with the right focus, so that neither of these warnings appears, and so that larger particles' scattering is not overwhelmingly bright when those particles come into the field of view. Furthermore, the recommended concentration for analytes is $1.4\times10^{9}$-$2.0\times10^{9}$ particles per milliliter, which corresponds to about 70-100 particles per frame. This is the optimal concentration to get good sizing data. Screen gain can be adjusted before data collection in a similar manner as the camera level, but this simply relates to the contrast of the particles against the background and does not affect the data collection, as it can be altered before data analysis to make particles more visible so the user can ensure the data analysis settings are correct.

Once a video capture is complete, the software can perform data analysis in which it applies the Stokes-Einstein relation (Equation 8) to determine particle size. There are many inaccuracies involved with this if the sample is dirty or there is optical interference, if the capture settings were not properly chosen during the capture, if the particle concentration is too low or high, or if the experiment constants are not properly selected and indicated. These settings include fluid viscosity, assumed in this Example 1 to be the same as water, as well as fluid temperature. It should be noted that the red NanoSight laser is equipped with a temperature control mechanism, but the blue one used in this Example 1 is not. Therefore, the temperature controller should be disconnected from the computer to reduce the risk of malfunction, and the ambient temperature of the room in which the capture is taking place must be entered. For these experiments, room temperature was always assumed to be 25° C.

An important factor to be considered when the data analysis step is reached is the detection threshold, which is set using a slider in the upper left corner of the screen when using the software. This indicates what size of apparent particles the software will track during analysis. There is no specific formula for choosing this number, but the video captures can be moved frame- to-frame to give the user an idea how many and which particles will be detected in each frame. Generally, a good overall setting may appear to miss a few smaller particles, and count some of the larger ones as multiple ones.

Fluorescence in Standard Configuration:

The initial steps for sizing fluorescent nanoparticles with the instrument in its standard configuration are the same as for normal scattering mode. The NanoSight literature [Ref. 9] recommends trying increasingly concentrated solutions of fluorescent nanoparticles until one with sufficient signal is identified. In the case of the quantum dots (Invitrogen by Thermo Fisher Scientific Qdot™ 655 streptavidin conjugate, 1 μM, ref# Q10123MP) used in this Example 1, previous studies using this analyte with the NanoSight found visualization success with a 100 times dilution of the stock solution of these particles [Ref. 7]. The buffer that has been previously mentioned, 0.05 M sodium borate, is very similar to the dispersant in which the stock solution of quantum dots is suspended. In this Example 1, it was found that this same dilution was effective to achieve the desired number of analyte particles per frame during data analysis. Before quantum dots at this concentration were even viewed through the microscope, it was clear that their concentration was at least somewhat sufficient because when the 405 nm was introduced, the area where the laser contacted the fluid in the channel was seen to fluoresce brightly at a red light wavelength, as expected.

For fluorescence, photo bleaching of the sample is a problem. This means that as the analyte is exposed to light, its fluorescence will gradually diminish. For this reason, the literature recommends use of a syringe pump, but this was not used in this Example 1. This also means that fluorescence measurements should be carried out before normal scattering measurements and that the laser and light used for general visualization of the microfluidic device during tests of the channel should be kept off whenever possible.

The microscope is aligned and focused in the same manner as described in the previous section. Then, the fluorescence filter is applied, which prevents the excitation wavelength of light produced by the NanoSight laser from being viewed through the camera or eyepiece, making only the emission wavelength visible. It is common for little to be seen when the fluorescence filter is first applied. To remedy this, the camera level is increased to its maximum. Screen gain can be adjusted to see if any particle movement is visible. If still no particles are visible, the camera histogram settings must be altered to narrow the intensities of light which the camera picks up. This is done in the "Advanced Camera" section of the hardware menu in the software.

Once particles are visible, the zoom must be further adjusted to bring the particles into focus due to changes in optics with the application of the fluorescence filter. If they are properly focused, they will appear in the same way as described in the previous section. A video capture that can be analyzed for particle size is then ready to be taken.

Visualization of In-Channel Particle Movement and Capture Using NTA

FIG. 5 shows the NanoSight laser used in these experiments with the added electrodes used to perform dielectrophoresis. The larger, yellow-jacketed wires are taped securely to the NanoSight instrument and attached to the external power source on the ends not pictured using alligator clips. Short pieces of 0.404 mm diameter platinum wire are attached to the ends of the yellow-jacketed wires and placed in the wells of the microfluidic device during analysis. Platinum is used because it is less susceptible to corrosion in the channel than other more common materials. It should be noted that, in this Example 1, visualization was attempted with channels oriented both parallel and perpendicular to the laser. This means that two electrodes were available on the left for the new perpendicular configuration, with another available on the right for use of the previously tried parallel configuration.

Besides the quantum dots, the gold colloid in use (BBI Solutions Gold colloid-30 nm, Product Code EM. GC30) has a known mean diameter of 28 to 30 nanometers with ≤8% variation in this size. There are $2.00\times10^{11}$ particles per milliliter of this solution.

Microscope oil (Olympus Immersion Oil Type F) is placed on the optical flat so that the microfluidic device may be moved freely on the surface to achieve proper alignment along with electrode connection. Microscope oil is used rather than water because it does not readily evaporate. No more than a partial drop is needed on the surface-if too much oil is used, the device is too mobile, and the oil can also leak onto the surface of the instrument beneath the optical flat, which is not good for the instrument and difficult to clean. The completed PDMS device is placed on top of this microscope oil evenly, with care taken to avoid forming bubbles in the microscope oil beneath the device, as this interferes with optics. If bubbles do form, the device can usually be moved around to move the bubbles from beneath the channel, which is the optical area of interest. It is important throughout the testing process to avoid touching the surface of the PDMS directly (for cleanliness) and also to make sure the wells and channel remain full of liquid, so they do not become hydrophobic, which renders the channel unusable.

Once the device is placed on top of the oil on the optical flat, final preparations for alignment and testing may begin if there is high confidence in the viability of the channel. However, it is often a good idea to visually inspect the channel through the microscope before adding analyte solution and attempting alignment. Usually, it is unknown whether a device will work until it is actually tested with the electrodes on, but a preliminary inspection under the microscope can reveal glaring defects. To prepare for analysis, the buffer solution is first removed from each end of the channel using a micropipette with a clean tip. Then, with another new tip, equal volumes (6-8 microliters) of analyte solution are placed in the wells at each end of the device. The electrodes are placed in the wells using tweezers. The entire NanoSight laser apparatus is then placed on the microscope stage as shown in FIG. 4.

Checking the viability of the channel is best done with the device oriented vertically with respect to the NanoSight stage, so that the channel is along the length of the transparent portion of the optical flat. The secondary light source used for general illumination of the channel is positioned so that the light comes from above at approximately a 45 degree angle from the channel. The 20×objective may be used to inspect individual teeth to ensure there are not preexisting blockages in those narrow parts of the channel. Another good way to ensure channel viability is that, with the channel filled with buffer, the electrodes are placed in the wells. A multimeter set to detect 200 milliohms of resistance is then used to ensure the electrodes connect across the length of the channel, though the fluid. This also verifies that the channel is viable, with no initial serious blockages.

Alignment is most easily performed using the 4×objective, and visualization and data collection are best at this magnification as well because it allows the visualization of a larger portion of the channel. As shown in FIG. 4, there is a spotlight at middle right that allowed the features of the channel to be seen through the microscope during alignment. This is the secondary light source used for general illumination to which has been referred earlier in this report. With only light from the laser, the features of the channel cannot be clearly seen.

The switch on the laser apparatus is turned on and the NTA 3.3 software is used to turn the camera and laser on. With the microscope in "eye mode" (not camera view), the focus is adjusted so that the teeth and their numbers are visible. One way to do this is using the major z-axis adjustment on the microscope to align the black and brown marks on the microscope body. At this point, the z focus as well as the x and y stage positions continue to be adjusted until one of the wells is found under the microscope. The z focus is adjusted further (perhaps using fine adjustment) to focus on the channel, then x and y are used to find the smallest teeth (22 through 24) with their numbers in focus. Tweezers are used to gently move the microfluidic device on the optical flat so that the laser beam, also visible, is centered in the channel between the teeth. At this point, adjust the z axis again so that the laser beam moves further into focus and the numbers on the teeth go out of focus. If the device is sufficiently cleaned, properly aligned, and properly focused, particle movement may be ascertainable when viewed through the eyepiece and will very be visible on screen, if only occasionally, when camera mode is enabled, even before voltage is applied.

It is important to note at this step that observation of capture is preferably performed when the laser is in focus beneath the camera in the region where capture occurs. It is important, therefore, to have the laser aligned and in focus at the teeth where capture is expected to occur. As will be discussed in the results, this was a challenge in this Example 1 as capture of these very small particles with modified devices for use with NanoSight had never been done before to the best of the Applicants knowledge. Therefore, the voltages and gates at which capture was expected to occur were unknown. Attempting to visualize capture therefore required some movement of the device from left to right (or vice versa) depending on the dimensions of the microfluidic device in use. Alternatively, if the device was being used with the channel configured perpendicularly to the laser, only one gate could be observed in detail at a time, and the device had to be moved inward and outward, rather than left and right, to visualize other gates, while maintaining the relatively fragile lateral alignment.

Once the laser was aligned and focused, the switch was made to camera mode. Looking at the view on the monitor, adjust the field of view and focus so that the numbers on the teeth are visible once again. This is the only way to know what part of the channel is in the field of view. Again, focus is placed on the smallest teeth. It is likely that only one tooth will be clearly visible on screen. Focus is placed on the center of the channel at the tooth of interest and z-axis focus is readjusted so that the laser is once again in focus.

At this point, data collection can take place. A standard measurement is performed with five captures, each 60 seconds long. As mentioned earlier, the temperature module is disconnected from the computer so the software will allow manual input of the ambient temperature. Since the solvent in the analyte solution is mostly water, assume water viscosity, which is the instrument's default.

The capture is begun with the software and after 5 seconds have expired the power source is turned on, starting at 500 volts for a half-channel and 1000 volts for a full-length channel like that described in the PDMS Device Modification section. If electrodes are properly connected and the channel is full of fluid, a visual shift is seen on the video as current runs through the channel. Remain at the initial voltage for about 30 seconds. If capture is not observed at any teeth at this voltage (the stage can be moved around during the experiment to make sure capture is not occurring somewhere out of the default field of view), voltage is increased by 25 V or more and the steps in this paragraph are repeated.

If a region where a large, bright spot is seen was not in the original field of view with power off, power may be turned off partway through the experiment to see if this bright spot disappears in the absence of an electric field. Then, power is then turned on again to see if this spot reappears.

This indicates that capture has been achieved at that point. Note, however, that turning power off and back on again in quick succession does not produce the same results as the initial application of the electric field due to the concentrated bolus created when the electric field was first applied. Once capture has been achieved and confirmed, power can be turned off and the experiment is complete. Focus is adjusted to verify the location of the capture (at what tooth it occurred). If voltage applied is too high or is applied for too long, boiling may occur in the channel which introduces bubbles and renders the channel unusable. This also ends the experiment.

Visualization of In-Channel Particle Movement and Capture Using NTA Fluorescence Mode The switch to fluorescence mode is made in the same way during an experiment with a microfluidic device as it is when the NTA is in its standard configuration, and the handles to achieve the right settings are the same. The placement of the spotlight is preferable for good visualization at this step. Due to scattering from the spotlight, which is not at a wavelength blocked out completely by the fluorescence filter, the numbers are visible on the teeth in fluorescence mode. With the proper settings and focus, individual particles will be clearly seen passing through (or getting captured at) the gate at which the laser is focused. Unlike in scattering mode, the outline of one set of teeth should also clearly be visible. The results and merits of using fluorescence for visualization of nanoparticle capture by dielectrophoresis will be discussed in detail in the "Results" section.

Troubleshooting

Over the course of this work significant insight was gained on how to troubleshoot the problems that may arise during this complicated procedure: If no shift in the fluid in the channel is seen when power is turned on during a run or if no capture is achieved, an electrode connection problem is possible. This could be due to the connection of the large wires to the power source, the settings of the switches on the power source, or, most likely the platinum wire connection to the larger wires. Another likely cause is blockage or incomplete filling in the channel.

As discussed previously regarding pre-experimental channel verification, a multimeter set to 200 mΩ resistance measurement can be connected to different points on the electrode circuit. If a reading is seen, connection exists. To verify whether a problem exists in wire connection or in the channel, the electrodes can be placed in an electrolytic solution such as buffer and the resistance tested again using the multimeter. If there is resistance in this situation but not when the electrodes are placed in the device wells, this indicates a blockage or dry section (bubble) in the channel.

Bubbling in the Channel

Bubbles may form due to boiling in the microchannel due to temperature increases by the introduction of electric current. Sometimes, when bubbling has occurred in a channel, the channel cannot be used again. However, degassing can be attempted. The device (still on top of the optical flat) can be removed from the NanoSight laser and placed carefully in a degasser. The degasser is sealed and the vacuum turned on. When the degasser has reached a vacuum state, air can be let back into the channel. The device is removed from the degasser and additional buffer is added to each well. At least 15 minutes is allowed for the channel to refill. Large bubbles are visible with the naked eye, the presence of small bubbles must be checked for using the microscope. It should also be noted that as long as channels are clear and the channel and wells are kept filled with buffer so they do not become hydrophobic, the device can be stored and reused.

Results And Discussion

Nanoparticle Tracking Analysis with Instrument in Standard Configuration

Before visualization of capture of 10-20 nanometer diameter quantum dots and 30 nanometer gold particles in microfluidic devices was attempted using NTA, characterization of the analytes was attempted in the designed configuration of the NanoSight to demonstrate its proper operation and to obtain background data on the analytes. These data were used to increase understanding of proper NanoSight settings and operation and saved to help with eventual calibration of the instrument for particle sizing before, during, and/or after dielectrophoretic capture.

Quantum Dots in Scatter Mode

Figure 6:
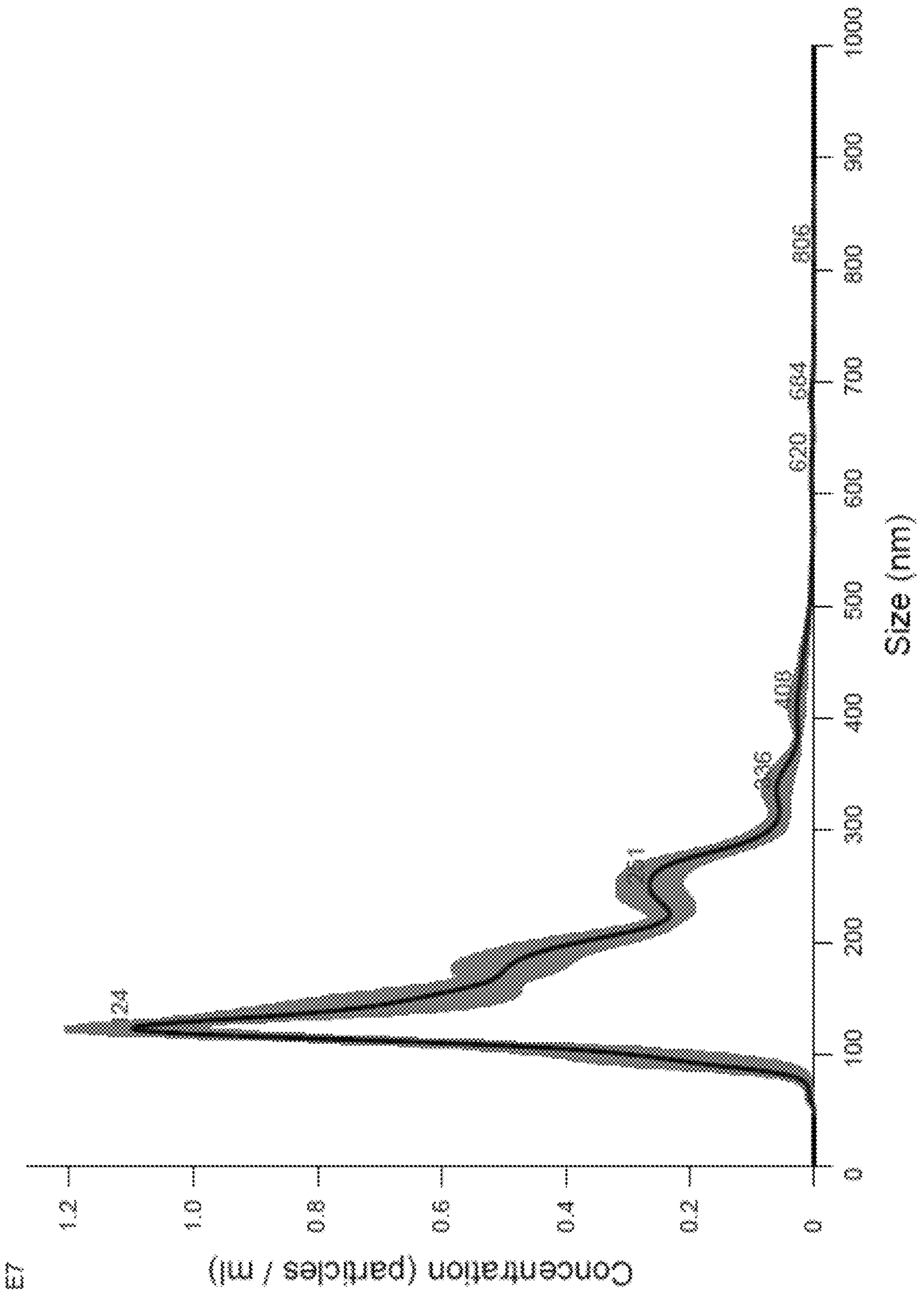
FIG. 6 is a graph illustrating 100 times dilution of quantum dots sized using the system of FIG. 1 in scattering mode.

Results for a sample of quantum dots diluted to 1/100 of their original concentration sized using Nanoparticle Tracking Analysis in normal scattering mode (without the fluorescent filter applied) appear in FIG. 6. Before beginning this analysis, it was noted that the sample appeared clean (without large numbers of foreign particles visible in the NanoSight field of view), but also less concentrated, with fluorescence less bright, than it had when tests were performed two days previously on exactly the same sample. This sample was prepared in a clean centrifuge tube with buffer that was taken directly from the large Erlenmeyer flask in which the stock solution was prepared and stored and put into a second clean centrifuge tube, from which it was measured and pipetted into the final sample.

Referring to FIG. 6, the blue numbers at major peaks in the graph denote particle diameters in nanometers. As may be seen from this plot, the most frequent and smallest major particles detected and sized in this test were about 124 nanometers in diameter, more than 6 to 12 times larger than the diameter of the analyte of interest. This could be due to excessive contamination by larger particles, making focus on the very small quantum dot particles difficult to achieve, or due to problems with the way the camera was adjusted for the experiment. It is possible, for example, that the most frequent particles detected were indeed quantum dots, but sized incorrectly because the camera level was too high, causing excessive scattering. It may also be noted that, during this experiment, the software-estimated overall particle concentration of the sample was $9.7\times10^8$ particles per milliliter, much smaller than the $6\times10^{12}$ particles per milliliter calculated based on the manufacturer-reported concentration of the stock solution.

Quantum Dots in Fluorescence Mode

Figure 7:
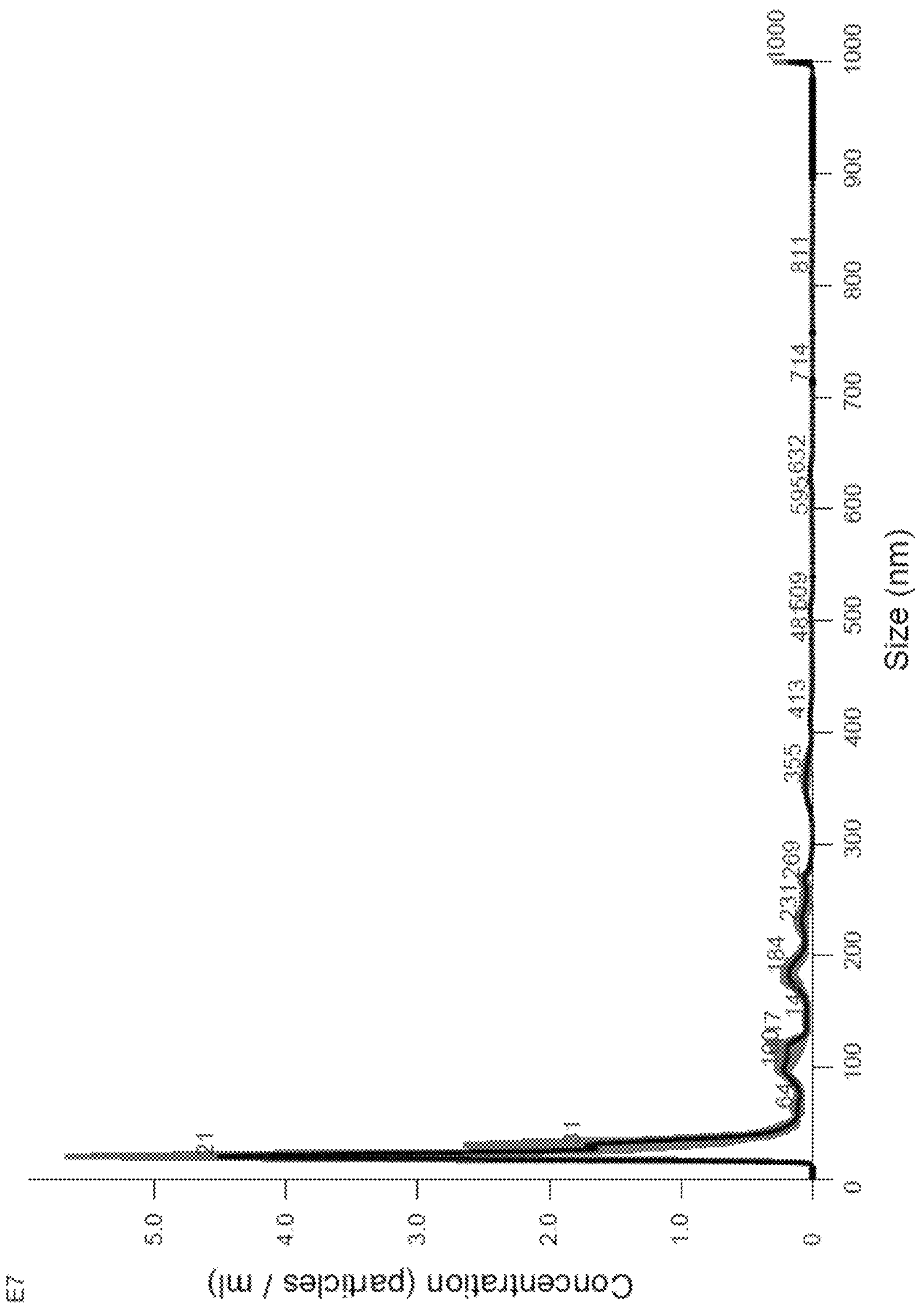
FIG. 7 is a graph illustrating 100 times dilution of quantum dots sized using the system of FIG. 1 in fluorescence mode.

The data best fitting expectations came from analysis of quantum dots in fluorescence mode. The data presented in the plot in FIG. 7 are for the same sample as that discussed above, except that, to avoid photobleaching and due to laboratory time constraints, this fluorescence analysis was performed two days prior to the scattering measurement described in that section. This means that the sample had been prepared according to the procedure established by prior experience and experiments to keep the sample as free as possible of contamination by other particles and had not previously been used, so little noise from contamination was expected in this experiment.

The most frequent sizes of particles tracked in this experiment were particles 21 and 31 nanometers in diameter, with concentrations of particles of all other sizes comparatively very low. Although this is on the upper end and even larger than the range of size expected in the quantum dots, this is a very large improvement over the results obtained in scattering mode (FIG. 6). This indicates that the capture settings as well as the detection threshold chosen in fluorescence mode were effective.

This experiment reported an overall particle concentration of $7.9\times10^8$ particles per milliliter, actually slightly less than for the scattering mode experiment, but with a higher percentage of those detected particles being of the expected size, and therefore assumed to be from the analyte of interest. This is also demonstrated in the difference in the maximum concentration values reported on the y-axes of the two plots, 1.1 particles per milliliter for scattering mode and nearly 6 particles per milliliter for fluorescence mode. Although the meaning of these units is uncertain, it is clear from this that the relative concentration of actual analyte particles of interest is over four times higher in the fluorescence mode data than in the scattering mode data for the same sample.

These data indicate that, for small particles, near the lower detection limit of 10 nm for the NanoSight, fluorescence mode can be effective, with the proper settings, in determining particle size and relative concentration with the proper settings. This is also possible in scattering mode, but even in clean samples, the analyte of interest is likely to obscured by unavoidable contamination of the sample by larger particles. It is postulated that the fluorescence reading was more successful in obtaining the expected results because it was not affected much by noise from non-fluorescent particles that also may have been present in the sample.

Modified PDMS Devices

As discussed above, several alternative fabrication methods were attempted for the PDMS devices used in this example to make the chance of successfully achieving capture and visualizing nanoparticles greater. Two of the biggest challenges with using NTA for visualization rather than the standard microscopes that have been used in the past are that, first, the entire length of the channel is challenging to use with the laser positioned parallel to the channel and, second, only the regions where the laser is focused can be visualized at a certain time, making the probability of success of experiments highly dependent on a good foreknowledge of the region of the device in which capture is expected to occur at the experimental voltage.

The modifications described above were made to help remedy these problems, and this section will discuss the suitability of these modifications for application in future similar experiments. The necessity of cutting the device so it will fit on the NanoSight stage has been a problem mainly because of the damage to the teeth, with less than half the gates in the original device available for use in the final device used for experimentation. This is because the well and smooth section of the channel was cut on one end. The first attempted modification attempted to preserve all teeth in the device used for experiments by removing both wells and punching holes on each end.

This method was successful in preserving all except the first gate in the device that was attempted, and potential capture of quantum dots was also observed on this device, with visualization achieved with the device oriented perpendicularly with the laser, as shown in FIG. 5.

The second modification made to PDMS device fabrication involved use of the entire length of the channel on a full-sized microscope slide. This layout was discovered to be functional with the channel placed perpendicularly to the laser. This placement also meant that both electrodes could be placed in the channel from one side. Many advantages to this layout were observed. Electrodes were found to be more flexible and connection was more easily obtained. Secondly, the device could easily be handled and aligned using only the fingers, rather than necessitating the very delicate use of tweezers necessary with the smaller devices bonded to cover glass. Thirdly, no teeth were lost, and the smooth channels and established wells were both maintained, making device fabrication and hydrostatic pressure balance simpler. Data will be presented later in the results section that was obtained with the device in this configuration.

Channel Visualization in Fluorescence Mode

One of the major problems associated with the application of NTA technology to this nanoparticle separation technique is the amount of noise in scattering measurements due to optical interference from the PDMS. Because the fluorescent filter blocks the excitation wavelength of light, which emerges from the laser, the effects of this scattering are almost completely eliminated in fluorescence mode. However, the presence of the white-light spotlight above the channel still allows for visibility of the teeth and their numeric labels in fluorescence mode. As was discussed above, proper use of fluorescence mode preferably uses proper placement of this white spotlight for general illumination of the channel above and diagonally from the channel, the highest available camera level, adjustment of the camera histogram to display only the most abundant wavelengths, and, finally, fine adjustment of focus different than that used for scattering mode due to the presence of the fluorescent filter.

Teeth in scattering mode demonstrate more interference when compared to teeth in fluorescence mode. In scattering mode, the edges of the teeth are not readily ascertainable without other points of reference such as numbers. In fluorescence mode, the edges of the teeth can be clearly seen. Also, the large amount of scattering that makes particles difficult to identify in scattering mode is absent in fluorescence mode. Particle movement is clearly visible in the channel both before and after voltage is applied, whereas it is often difficult to see before capture has occurred in scattering mode, particularly if the device is not extremely clean or focus on the laser is not exact.

Quantum Dot Capture

Stock solution of quantum dots (QDs) are provided from Life Technologies (QDot 655 Streptavidin Conjugate. The QDs are ~15-20 nm in size and are comprised of a CdSe core with ZnS shell.

Each QD contains 5-10 surface-immobilized streptavidin molecules. The QDs are dispersed in a solution of 1 M betaine (a cryoprotectant), 50 mM borate, pH 8.3 with 0.05% sodium azide (a preservative). The stock concentration is 1 μM, or approximately 6×1014 particles/mL.

The QDs exhibit a large fluorescence stokes shift, which reduces the filtering burden on fluorescence instrumentation. A suitable line source, such as a blue/green diode laser, can be used for excitation and the emission collected through a long-pass filter. If desired, QDs with a range of emission wavelengths (525-800 nm) are also available.

Quantum dot capture was ostensibly achieved on the standard device design as well as both alternative designs that preserved all teeth. The most clear capture visually was observed in the first test with quantum dot analyte, which used the standard device design. This was observed at 400-500 volts at tooth 17.

During capture, there are no bubbles visible in the channel, and the particles captured fluoresced red, indicating that they are indeed quantum dots and not other particles. It should be noted that power was turned on and off several times during this test, which can affect the location and voltage of capture by creating concentration gradients. It should also be noted that while capture began to be observed before this screenshot was taken, this moment was captured after significant time had passed since capture began. During that time, the intensity of the capture only increased, and the area of intense light to the left of the gate began to appear before the expected area of intense scattering at the gate itself.

In the first alternative design, which preserved all teeth except tooth 1 but neither of the wells, capture was expected to occur at a similar voltage as in the experiment already discussed above, since a half channel was still being used. The device was oriented perpendicularly with the laser in these experiments, so that only one tooth was visible at a time. The initial focus was placed on tooth 24, as this gate has the smallest separation distance (equal to gates 22 and 23) and is therefore expected to be the first gate at which capture will be observed with increasing voltage. The experiment was begun at 500 volts. Particles at that voltage moved quickly through this smallest gate in the direction of the outlet well, indicating that this voltage was not high enough to achieve capture of the quantum dots. Particles visibly slowed down as they approached the gate at this voltage, and a few particles appeared to be captured. When the voltage was increased further to 650 volts, significantly more capture was immediately observed at this gate. Without being bound to a particular theory, it was postulated that the ideal voltage to achieve capture of quantum dots at this gate was somewhere between 600 and 650 volts, so a variety of settings in this range were tried before the voltage was turned off. None achieved capture as quickly and effectively at tooth 24 as 650 volts.

However, it was also postulated that capture was occurring at other teeth as well at this voltage, since at 650 volts particle flow through the channel toward tooth 24 significantly decreased. After power had been turned off twice, particle movement through gate 24 was observed in both directions at 660 V. Presumably, movement in opposite directions was due to differing particle size, as quantum dots are not all uniform. Although the largest and most intense spot of scattering, presumed to also be the most concentrated area of capture in this device, was at tooth 24, there was also significant apparent capture observed at teeth 21, 20 and 18. It was not possible to illuminate all these regions with the laser simultaneously, but each of these areas were checked in turn with the laser, and it was found that none of them displayed obvious fluorescence, although they were visible under the microscope through the camera in fluorescence mode.

Particularly since, when viewed through the camera, the device was also illuminated by the white-light spotlight, this could have contributed to their visibility even in fluorescence mode. It is assumed, however, that these particles are quantum dots, as, even with contamination, this is the only substance presumed to be in the analyte solution abundantly enough to observe capture at several different locations. It also makes sense that the particles may not have all captured at the same gate because there are deviations of up to 10 nanometers, 50-100 percent of their total diameter, in their sizes. It is possible that photobleaching made the particles fluoresce less intensely by the time capture was achieved, although fluorescence was visible in the device wells when they were illuminated with the laser.

The second modified device, which preserved the entire channel including both wells, was used twice to attempt quantum dot capture, and results obtained corroborated results from the first modified device. In the first experiment with this device, the voltages used were similar, at first, to voltages used in previous experiments with devices about half as long. Because the distance between the electrodes is greater in the full device, however, the voltage needs to be increased by about the same factor as the distance between the electrodes to achieve comparable capture. This was observed to be true as higher voltages were tested in the second experiment.

In the first experiment with this device, the starting voltage was 500 V. It was increased to 660 volts, the maximum voltage used in the previous device that was only half the full length of the channel, and still no capture was observed at tooth 24. As the voltage was increased to 750 V and beyond, the particles were observed to slow as they passed through the strong dielectrophoretic field in the gap between the teeth. After several minutes, some beginning signs of capture were seen at this voltage, and small signs of apparent capture continued to be seen after the voltage had been decreased to 650 V. The most significant capture site was tooth 22, which has the same gap size as tooth 24. The small, light spot visible centered between tooth 22 is assumed to be a group of quantum dots, although fluorescence is not obvious.

In the case of the four times magnification, the fluorescent captured particles are visible as a tiny light-colored dot next to the faintly-visible laser, centered between the two larger white dots, which are the numbers labeling the gate as "22" scattering light from the spotlight illuminating the channel. Numbers 21 and 23 are visible on either side of the laser and dot of captured particles.

It should be noted that during this experiment, particles were initially flowing the opposite direction of that observed in previous experiments, indicating that the positive and negative power connections were connected in the opposite direction as they had been previously. Care should be taken in the future to connect these electrodes consistently in the same way. The convention has been to connect the positive electrode to the inlet end and the negative on the outlet end. It was verified that changing the direction of connection also changed the direction of particle flow in the channel due to electrokinetic forces, which is consistent with theoretical expectations.

Higher voltages were used in the second experiment with this full-length device. Since it was approximately twice the length of devices previously used, this experiment was begun at 1000 volts. In fluorescence mode, the laser was again focused at tooth 24. Capture was achieved at this tooth after only a few seconds, and this area of capture grew larger over time, as observed in other experiments. After some additional time had passed, no more increase in intensity was observed, even when voltage was increased to 1100 V. This is also consistent with other experiments. Upon inspection of the rest of channel after power had been turned off to verify electrical connection (because no particle movement was being observed), additional areas of potential capture were observed at teeth 21-22, with a bubble at tooth 23 and very large bubbles at teeth 17-19. This was the only quantum dot experiment in which bubbling was observed. It is also the experiment with the highest voltage and the experiment where capture occurred most quickly.

The fact that capture occurred quickly in this device at twice the minimum voltage applied in other experiments suggests that the approximate linear scaling of electrode distance to strength of electric field is appropriate. The full channel is slightly less than half as long as the channels used in earlier experiments, so quick capture accompanied by bubbling at a voltage slightly less than double the voltage observed for the smaller channels is an expected result.

Table 3 below summarizes the results of experiments with apparently successful quantum dot capture

TABLE 3

Summary of results of quantum dot capture experiments

| Device Description | Capture Gates | Capture Voltage (V) | Notes |
|---|---|---|---|
| V2 Smaller second half & outlet well | 17 | 400-500 | Clearest fluorescence |
| V2 Smaller teeth only | 18, 20, 21, 24 | 650 | No strong fluorescence |
| V2 Smaller full channel | 22 | 750, maintained at 650 | Small amount of particles captured |
| V2 Smaller full channel | 21, 22, 24 | 1000 | Quick capture, significant bubbling at teeth 17-19 |

Thirty Nanometer Gold Particle Capture

Some initial success was achieved in the capture of thirty nanometer gold particles, and some preliminary data collected. However, despite promising initial results, these experiments were never able to be repeated, and focus was shifted in the time remaining in the project toward quantum dot capture and its visualization using fluorescence mode. However, the results of this initial apparent capture of 30 nm gold particles are presented here. This device was fabricated using the above described method of cutting the device approximately in half, to the length of a glass cover slide, and bonding the portion with the smaller teeth to that cover slide. The laser was aligned parallel to the channel, also following the original configuration.

Capture occurred at tooth 18, which has the same separation distance (3.69 μm) as tooth 17 at which capture of quantum dots was first thought to be observed. Since these particles are not fluorescent, these experiments were performed in the NanoSight's normal scattering mode. Capture was achieved with 500 volts applied.

Capture and Separation of Quantum Dot-Nanoparticle Mixture

After capture of both quantum dots and 30 nm gold particles had ostensibly been achieved using the traditional device design, an attempt was made to insert a mixture of these particles into a device and separate them by capturing them at different gates and voltages. This was only attempted on one device, which was fabricated and configured using the previously established procedure rather than the modified procedures that have been discussed. Significant bubbling occurred in the channel before any signs of capture were seen. Voltage in these tests began at 400 V and was increased during the run to 500 V. Laser and camera were originally focused at teeth 17 and 18. It is possible that capture occurred elsewhere in the device not in the laser's focus.

Conclusions

Numerous approaches were developed in this Example 1 for the successful use of nanoparticle tracking analysis for the visualization of dielectrophoretic capture of very small particles in sawtooth-patterned microfluidic devices. Such capture is expected to occur according to size, zeta-potential, and possibly due to other properties, at the narrow gaps between the "teeth" in this device, as this is where the nonuniform electric field gradient is steepest. Although such separation has been visualized in the past using standard microscopy, the use of NTA is advantageous because, with continued development, particle size can be calculated in real time, allowing label-free and simultaneous characterization and separation of samples with mixed and unknown analytes.

This Example 1 explored use of the NanoSight's fluorescent filter for the first time. The proper manner of preparing a sufficiently concentrated and clean sample of fluorescent (and non-fluorescent) analyte was developed. A procedure was also developed to achieve the proper settings for use of both scatter and fluorescence modes on the NTA instrument, and quantum dots, 10-20 nanometers in diameter, very near the lower detection limit for the NanoSight LM10 NTA instrument in use, were successfully visualized and relatively accurately sized with the instrument in its standard configuration.

Use of the fluorescence mode on the NanoSight presented a number of important advantages in both the instrument's standard mode and when its use was modified for visualization of the microfluidic channel. In the standard configuration, noise from larger, non-fluorescent particles present in the sample due to nearly inevitable contamination was eliminated, allowing for more accurate sizing. For capture visualization using a microfluidic device, the channel and gate of interest were clearly visible, as were the particles, with very little noise. This is a great improvement over constant use of scattering mode alone for channel visualization, as the PDMS itself causes significant optical interference that cannot be eliminated without the use of the proper filter.

Using fluorescence mode, multiple apparent captures of quantum dots were observed, also a significant accomplishment, as capture of particles in this size range had only recently begun to be observed in parallel work on this project. This capture occurred at the smallest gate separation distances (the areas of the device with the steepest electric field gradient, where capture would be expected to be achieved first) at 650 volts for the channel cut to the length of the NanoSight stage, and at 1000 volts for the full channel. The higher voltage achieved capture quickly, but also caused rapid and widespread bubbling in the channel, suggesting that a slightly lower voltage may be more effective. Capture was also apparently achieved a third time at a tooth with larger gate separation distance and at a voltage of 400-500 volts. This capture took longer to observe and was never recreated.

This Example 1 also explored novel designs for PDMS devices that would increase their usability and effectiveness as they were integrated with the NanoSight system. A first attempt at modifying the device design that had previously been in use allowed the use of all teeth except one, rather than less than half of them, while still allowing the device to fit on the 405 nanometer NanoSight laser stage such that the channel could be visualized with the laser either parallel to the teeth or perpendicular. Successful apparent capture of quantum dots was achieved on this device at teeth 18, 20, 21, and 24 at 650 volts. A second modified design allowed use of the entire length of the channel, and two successful quantum dot capture experiments were performed using this device. These experiments confirmed a theory-supported observation that the strength of an electric field is a linear function of both the voltage and the distance between the electrodes.

Because this channel was nearly twice as long as previously used channels, the voltage required for capture was nearly twice as high.

This device was very easy to manipulate on the NanoSight stage, easier to prepare, and easier to use to balance hydrostatic pressure of the analyte in the wells to avoid particle movement in the channel due to forces other than electricity. Although only one tooth can be visualized at a time with the laser, this is not much different from the former configuration, as only the area of the laser that is in focus in the device may be visualized with certainty even if the laser is visible along the majority of the length of the channel. With sufficiently flexible electrodes, this design allows for visualization of any tooth in the device, whereas use of the device parallel to the laser does not as easily allow for visualization of teeth on the far end of the channel.

Capture of thirty nanometer gold particles was also ostensibly achieved once at tooth 18 with 500 volts applied. This was on a half-length device fabricated in the manner developed previous to this Example 1. These results could never be corroborated, however, and an attempt to separate a mixture of quantum dots and these nanoparticles was unsuccessful. However, these preliminary results with the gold nanoparticles coupled with the results with the quantum dots previously discussed suggest that separation and characterization of a mixed sample of very small particles is feasible using this technique.

Much work remains related to this project. Recommendations include always using the full channel, or at least all teeth, for devices used in future experiments, as well as making use of the option to orient the channel perpendicularly to the channel to attempt visualization at a single gate. It is also recommended that a greater body of data be amassed for capture of 30 nanometer gold particles before a mixture is tried again. When this mixture is tried, it is recommended that the samples first be introduced to the channel separately. Quantum dot capture can be achieved first at the smallest gate size, then the larger particles may be introduced to see if their capture is observed at a different gate at the same voltage.

It is also recommended that fluorescence mode be used frequently in future experiments. Future researchers should consider experiments with fluorescently labeled particles of other diameters, not just quantum dots. The clarity of the particle movement and capture with the proper settings in fluorescence mode presents exciting opportunities for performing quantifiable nanoparticle tracking analysis by the recalibration of the instrument. The data collected in this Example 1 can be further analyzed for particle size data to help with this calibration, but capture of particles of different sizes in fluorescence mode is also necessary for this.

Example 2

Unlabeled And Unaltered Mouse Hepatitis Coronavirus Characterized By Dielectrophoresis Using Laser Light Scattering Detection Virus Preparations, Characterization, Annotation and Processing.

All details of viral sample preparation are recorded electronically within the 'Benchling' environment (Benchling.com), thus annotation for all introduced solutions is available for each DEP device experiment. Each sample-containing tube is labeled such that the full preparation, characterization and storage is accessible-associated uniquely to that sample.

Both MHVwt and MHVmu were grown and purified at BSL2 according to well established virological procedures. [Ref. 11-15] Appropriate receptor-bearing host cells (human lung cells and mouse cells for MHV) were infected with well-characterized and sequence-authenticated local virus stocks. At established times post-infection, dependent on the specific virus, cell culture supernatant was removed and clarified by slow speed centrifugation to remove cell debris, followed by two density gradient centrifugation steps. Viruses were concentrated by centrifugation on a 30% sucrose cushion, followed by a continuous 25-60% sucrose gradient. An available alternative coronavirus purification protocol are based on isopycnic sedimentation on potassium tartrate gradients. Buffers used include Tris maleic acid, EDTA NaCl buffer, pH 6.0 (TMEN), MOPs-saline-EDTA (MSE) buffer, pH 6.8 or 1 mM HEPES pH 6.7-7.2. Virus preps are characterized and quality control determined using plaque assays to quantify infectious virus, NTA particle count and homogeneity (NanoSight, malvern.com), qRT-PCR for genome equivalents, Western blotting using viral protein specific antibodies, transmission electron microscopy and cryoEM. Consistent with virology norms, any qualitative (imaging) or analytical result which suggests the virus preparation was not a pure homogeneous preparation induced reprocessing or disposal. Following analysis of virus preps samples were aliquoted, annotated and stored at −80° C. for DEP testing and validation.

Buffer Preparation and Reasoning.

The choice of an operating DEP buffer included many considerations, including low conductivity (reduced Joule heating), adequate buffing capacity (absorb electrolysis products), and biocompatible (virions retain viability). [Ref. 16-18] The storage buffer typically used for coronavirus, TMEN has a high conductivity of 1600±200 mS/cm. Typical Good's Buffers (biocompatible) were surveyed, and HEPES was chosen, and 10 mM (adjusted to pH 6.5) and 0.3 M sucrose, the conductivity is 60±5 μS/cm. Using this buffer, the device current under typical operational conditions is about 2 μA. Recent cryoEM studies with SARS-COV-2 use HEPES buffer at pH 6.7-7.2 [Ref. 19-23] and NTA studies show MHVwt, Sindbis, MHVmu and other viruses retain viability.

Because we are using a non-selective sensing mechanism (light scatter), particles must be absent from the buffer. The buffer was filtered through 50 nM pore membrane in a class II biosafety hood and stored in particle-free glass tube or bottles. Buffers were prepared with particle counts at or below $10^5$ particles/ml (ViewSizer 3000, Horiba). This level was determined to be essentially 'no particles' present in the device experiments. All buffers were tested initially and then monitored for conductivity, viscosity, and pH, and particle count and size distribution. Device fabrication was performed within a laminar flow hood with particle count monitor according to standard procedures. [Ref. 24,25] Cover slips were cleaned by submerging them in a 2% solution of Hellmanex III (hellma.com) at 35° C. for 45 minutes. They were then rinsed within a fume hood using pure acetone, then isopropanol, and followed by low particle count 18 MΩ DI water (particle count in ~50-500 nm monitored to be less than $10^5$ particles/mL) rinse then sonication for thirty seconds. The formed channel devices may be stored, wrapped in plastic at 4° C., or used immediately. Upon use, the device was inspected using white light bright field microscopy to ensure that the device is well-formed and free of debris.

Experimental Process, Record Keeping and Annotation.

Immediately prior to introduction of buffer or virus sample to the device, they were characterized for pH, conductivity and particle count and size distribution (NTA). Negative control experiments were performed using buffer-only and the full voltage sequence executed with scattered light images recording. Experiments were conducted by using a high voltage sequencer (HVS448, Labsmith.com) and a custom laser scatter microscope (see FIGS. 10 and 11 and below), and the data shown in FIGS. 8 and 9 were captured with this system. This microscope utilizes two angled lasers (Stingray 660 nm 100 mW CW, Coherent) to scatter light off of sample particles within a DEP device into a 20×objective (LMPLFLN20x, Olympus). The image is captured on large format camera (SVCam exo342MU3, SVS-Vistek GmbH). Voltage, current and images are recorded before, during and after the excitation profile. Data were disregarded if any significant aberrations are noted with the current profile or obvious contamination noted in the images.

Videos of virion sample and buffer control sample under specific voltages were compared for the concentration of moving particles, particle sizes, and capture behaviors. Metadata including current, pH, conductance, virion sample characterization, and sample identity and thaw date were used as internal comparisons to establish validity of individual experiments and identify failures such as buffer contamination, instrument malfunction, electrolysis-induced pH swing. All data are recorded into the Benchling electronic notebook environment. All EKMr values were determined using previous strategy, with appropriate replicates [Ref. 26,27] with respect to individual determinations, devices, operators, and virus preparations.

Experimental

For all experiments in Example 2, a high voltage sequencer (LabSmith HVS448) and a custom laser light scatter image system (see FIGS. 10 and 11 and below) were used, where data from the power supply and imaging system will be synchronized. Captured data includes voltage and current delivered to the DEP device, and the image sequence covering information before, during, and after voltage is applied. Current trace is used as a quality monitor and troubleshooting tool.

Raw image sequences are processed utilizing the following three steps: a percentage of the frames (OV or no voltage present) are randomly selected and median value for each pixel is determined. A binary threshold is applied to this median frame to remove noise and return the DEP device background information. The second step is a frame difference subtraction to detect moving objects within the image sequence. A binary thresholding is applied to remove noise related to excitation power fluctuations. The last step is to add the DEP device background information back into each frame to allow registry of particle location within the device so net-zero force zones can be determined.

Videos of virus sample and buffer control sample under specific voltages were compared for the concentration of moving particles, particle sizes, and capture behaviors. Metadata including current, pH, conductance, sample characterization, and sample production date are used as internal comparisons to establish validity of individual experiments and identify failures such as buffer contamination, instrument malfunction, current induced pH swing or other issues.

Custom Laser Light Scattering Set Up

1. Component Set Up

Figure 10:
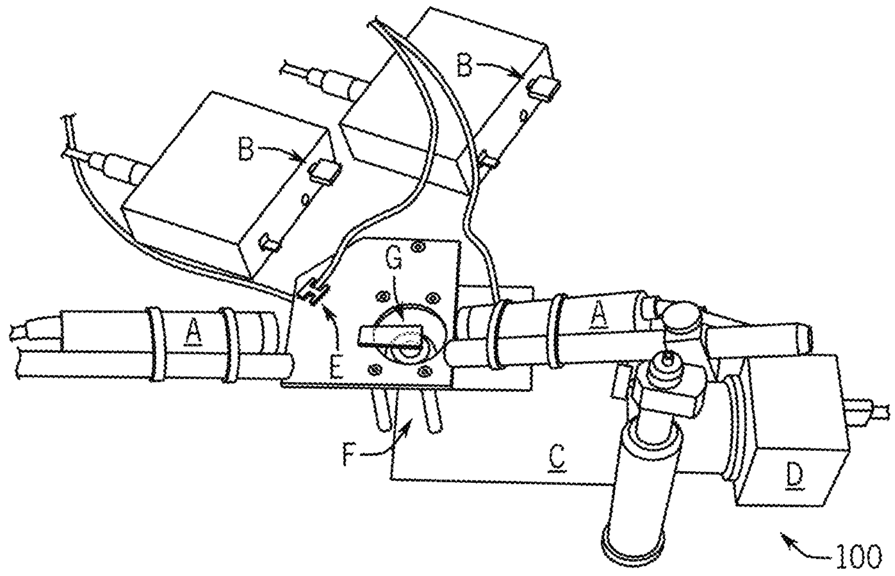
FIG. 10 shows a laser light scattering device in accordance with some embodiments of the present disclosure.
Figure 11:
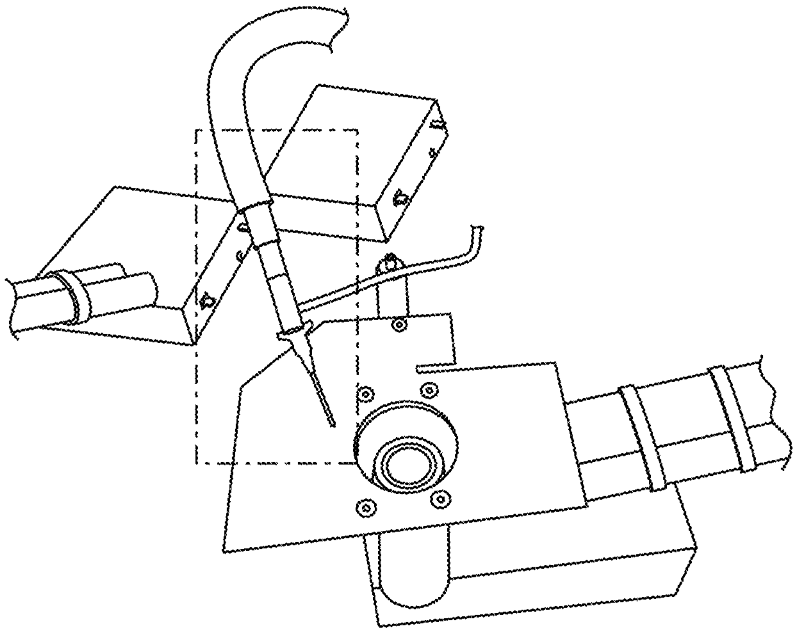
FIG. 11 shows another view of the laser light scattering device of FIG. 10.

Looking at FIG. 10, the components of the custom laser light scattering device 100 are as follows:

- Laser (A)—a few centimeters away from the microfluidic device with both beams converging on the same spot—provides illumination of channel and analytes;
- Laser control (B)—about one dozen centimeters past custom scatter assembly—key acts as on/off toggle for lasers;
- Optical tube (C)—affixed between objective and camera—defines the light path between the objective and camera;

Camera (D)—one end of custom scatter system—image acquisition;

Electrode (E)—affixed at inlet and outlet/submerged in running solution—provides voltage to microfluidic device; and Objective (F)—directly under stage/coverslip—gathers light and magnifies image for camera.

The operation steps for the laser light scattering device 100 are as follows:

Place the device 100 onto the stage so that the desired gates are in the camera field of view. Adjust the focus in bright field if needed.

Turn on the laser(s). Move the laser(s) to illuminate the desired gates. One laser can be used for visualization of larger particles (μm), while two lasers are recommended for small particles (nm). The beams should align with the channel length. Avoid directing the beam at the device edge or the inlet or outlet, as it will cause reflection and introduce artifacts. Tape the coverslip (not the PDMS itself) down to the stage upon choosing desired location Place the electrodes in inlet and outlet using the adjustable clamps to hold the leads. See FIG. 11.

2. Data Recording

Data recording is as follows:

With CBio software opened, click apply voltage to choose the setting;

Decide the voltage regime (single or sequence). For sequence, different steps are available;

Choose the voltage, application time (rec: 10-15 s) and relaxation time (2-5 s) for each step;

Click stream and save the image in designated folders.

Results

Figure 8:
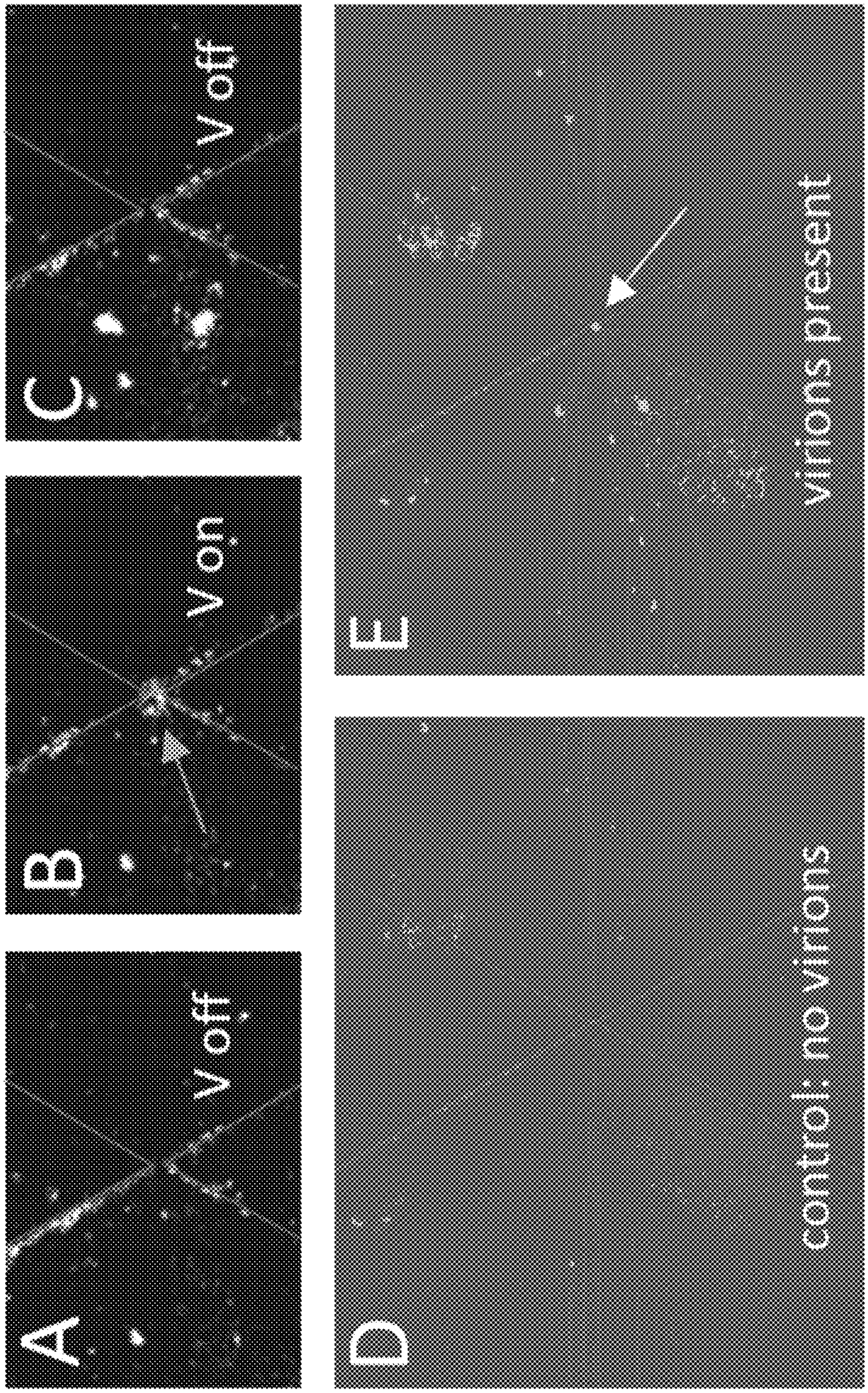
FIG. 8 shows the dielectrophoretic capture of wild-type murine hepatitis virus (MHVwt) in a microfluidic device containing ~$10^8$ particles/mL of MHVwt in a buffer composed of 0.3 M sucrose and 10 mM HEPES; constrictive insulating geometry is demarcated by solid red lines in panels A-C and solid blue lines in panels D-E; all panels depict a gate with a 3 micron separation distance; panel [A] depicts a single gate before the application of voltage; panel [B] depicts a bolus of captured material (blue arrow) at the same gate during the application of DC voltage; panel [C] depicts a release of the bolus at the same gate after the application of voltage has ceased; panel [D] shows time-averaged intensity of particles transiting the gate during a negative control run with no virions present; panel [E] shows time-averaged intensity of particles transiting, capturing (white arrow), and releasing at the gate during the application of DC voltage.

FIG. 8 shows dielectrophoretic capture of wild-type murine hepatitis virus (MHVwt) in a microfluidic device containing ~$10^8$ particles/mL of MHVwt in a buffer composed of 0.3 M sucrose and 10 mM HEPES; constrictive insulating geometry is demarcated by solid red lines in panels A-C and solid blue lines in panels D-E; all panels depict a gate with a 3 micron separation distance; panel [A] depicts a single gate before the application of voltage; panel [B] depicts a bolus of captured material (blue arrow) at the same gate during the application of DC voltage; panel [C] depicts a release of the bolus at the same gate after the application of voltage has ceased; panel [D] shows time-averaged intensity of particles transiting the gate during a negative control run with no virions present; panel [E] shows time-averaged intensity of particles transiting, capturing (white arrow), and releasing at the gate during the application of DC voltage.

Figure 9:
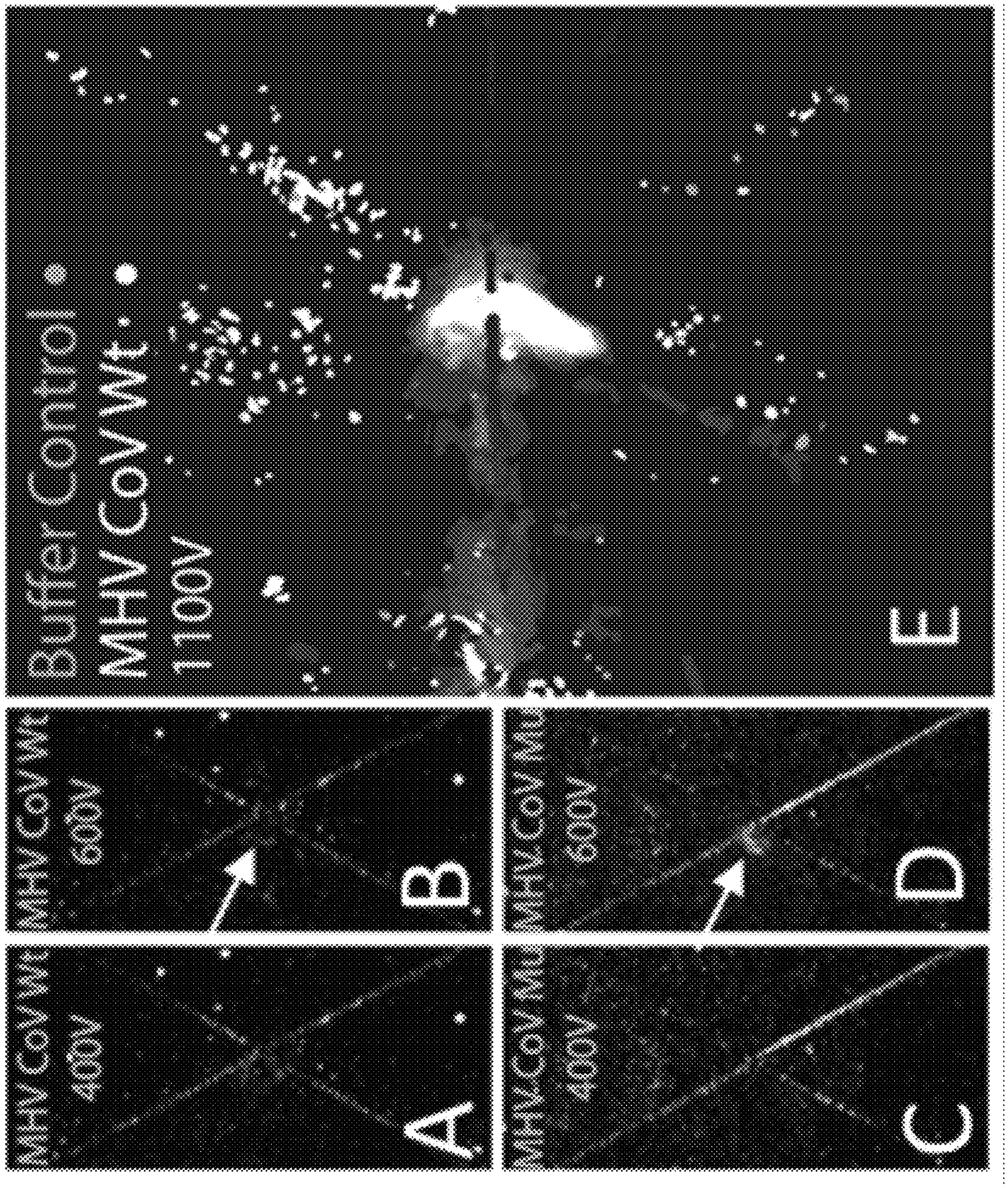
FIG. 9 shows the biophysical differentiation of unlabeled and unaltered native MHVwt versus a mutant (MHVmu) using dielectrophoresis device with laser light scattering. Each experiment used ~$10^8$ particles/mL of MHVwt or MHVmu in a buffer composed of 0.3 M sucrose and 10 mM HEPES. Panel [A] Wild type with 400 V applied (no capture observed), panel [B] wild type with 600 V applied (no capture observed (white arrow), panel [C] mutant with 400 V applied (no capture observed), panel [D] mutant with 600 V applied (capture observed, white arrow), panel [E] composite image showing post processing of control (blue, no virions present) and wild type virions present (white) noting that the buffer control shows little or no capture of particles. The MHV Mu is a recombinant virus generated in the WT MHV A59 background (Accession AAX23977.1). The MHV WT A59 spike (S) is replaced by the S gene from MHV-2 strain (Accession AAf19386.1) and a EGFP gene is inserted into the ORF4 gene locus.[Ref. 12, 13] The MHV-2 S protein is 80.26% identical to WT MHV A59 S. MHV S has a 44 aa insertion, in addition to 6 aa deletions at three locations in the protein and 3 aa substitutions in the furin cleavage site. EGFP is expressed during infection, but it is not incorporated into virion particles.

FIG. 9 shows biophysical differentiation of unlabeled and unaltered native MHVwt versus a mutant (MHVmu) using dielectrophoresis device with laser light scattering. Each experiment used ~$10^8$ particles/mL of MHVwt or MHVmu in a buffer composed of 0.3 M sucrose and 10 mM HEPES. Panel [A] Wild type with 400 V applied (no capture observed), panel [B] wild type with 600 V applied (no capture observed (white arrow), panel [C] mutant with 400 V applied (no capture observed), panel [D] mutant with 600 V applied (capture observed, white arrow), panel [E] composite image showing post processing of control (blue, no virions present) and wild type virions present (white) noting that the buffer control shows little or no capture of particles. The MHV Mu is a recombinant virus generated in the WT MHV A59 background (Accession AAX23977.1). The MHV WT A59 spike (S) is replaced by the S gene from MHV-2 strain (Accession AAf19386.1) and a EGFP gene is inserted into the ORF4 gene locus. [Ref. 12, 13] The MHV-2 S protein is 80.26% identical to WT MHV A59 S. MHV S has a 44 aa insertion, in addition to 6 aa deletions at three locations in the protein and 3 aa substitutions in the furin cleavage site. EGFP is expressed during infection, but it is not incorporated into virion particles The present disclosure has described one or more preferred aspects, and it should be appreciated that many equivalents, alternatives, variations, and modifications, aside from those expressly stated, are possible and within the scope of the invention.

References

[1] M. Hughes, "Nanoparticle manipulation by electrostatic forces," in *Nanoscience, Engineering and Technology Handbook*, CRC Press, 2011.

[2] M. A. H. Paul V. Jones, "Development of the resolution theory for gradient insulator-based dielectrophoresis," *Electrophoresis*, vol. 36, pp. 1098-1106, 2015.

[3] N. G. Weiss, "Dielectrophoretic mobility determination in DC insulator-based dielectrophoresis," *Electrophoresis*, vol. 32, pp. 2292-2297, 2011.

[4] S. J. R. Staton, "Characterization of particle capture in a sawtooth patterned insulating electrokinetic microfluidic device," *Electrophoresis*, vol. 31, pp. 3634-3641, 2010.

[5] Ø. G. M. Sverre Grimnes, *Bioimpedance and Bioelectricity*, Elsevier, 2015.

[6] M. A. H. Claire V. Crowther, "Refinement of insulator-based dielectrophoresis," *Analyst*, vol. 142, p. 1608, 2017.

[7] Rebecca A. Dragovic, "Sizing and phenotyping of cellular vesicles using Nanoparticle Tracking Analysis," *Nanomedicine: Nanotechnology, Biology, and Medicine*, vol. 7, pp. 780-788, 2011.

[8] Malvern, "NanoSight LM10 NTA Software Guide," 2014.

[9] Malvern Instruments Worldwide, "Fluorescence Nanoparticle Detection using NanoSight NTA," Malvern Instruments Limited, 2017.

[10] ThermoFisher Scientific, "QDot 655 Streptavidin Conjugate," Thermo Fisher Scientific, [Online]. Available: https://www.thermofisher.com/order/catalog/product/Q10121MP. [Accessed 16 Apr. 2019].

[11] Leibowitz, J., Kaufman, G. & Liu, P., Coronaviruses: propagation, quantification, storage, and construction of recombinant mouse hepatitis virus. *Curr Protoc Microbiol* Chapter 15, Unit 15E.11, doi: 10.1002/9780471729259.mc15e01s21 (2011).

[12] Arndt, A. L., Larson, B. J. & Hogue, B. G., A Conserved Domain in the Coronavirus Membrane Protein Tail Is Important for Virus Assembly. *Journal of Virology* 84, 11418-11428, doi:10.1128/jvi.01131-10 (2010).

[13] Venkatagopalan, P., Daskalova, S. M., Lopez, L. A., Dolezal, K. A. & Hogue, B. G., Coronavirus envelope (E) protein remains at the site of assembly. *Virology* 478, 75-85, doi:10.1016/j.virol.2015.02.005 (2015).

[14] Verma, S., Lopez, L. A., Bednar, V. & Hogue, B. G., Importance of the penultimate positive charge in mouse hepatitis coronavirus A59 membrane protein. *Journal of Virology* 81, 5339-5348, doi:10.1128/jvi.02427-06 (2007).

[15] White, T. C., Yi, Z. P. & Hogue, B. G., Identification of mouse hepatitis coronavirus A59 nucleocapsid protein phosphorylation sites. *Virus Research* 126, 139-148, doi:10.1016/j.virusres.2007.02.008 (2007).

[16] Markx, G. H., Dyda, P. A. & Pethig, R., Dielectrophoretic separation of bacteria using a conductivity gradient. *Journal of Biotechnology* 51, 175-180 (1996).

[17] Hyler, A. R., Hong, D., Davalos, R. V., Swami, N. S. & Schmelz, E. M., A novel ultralow conductivity electromanipulation buffer improves cell viability and enhances dielectrophoretic consistency. *Electrophoresis* 42, 1366-1377, doi:10.1002/elps.202000324 (2021).

[18] Corstjens, H., Billiet, H. A. H., Frank, J. & Luyben, K., Variation of the pH of the background electrolyte due to electrode reactions in capillary electrophoresis: Theoretical approach and in situ measurement. *Electrophoresis* 17, 137-143, doi:10.1002/elps.1150170123 (1996).

[19] Liu, C. et al., The Architecture of Inactivated SARS-COV-2 with Postfusion Spikes Revealed by Cryo-EM and Cryo-ET. *Structure* 28, 1218-1224.e1214, doi: 10.1016/j.str.2020.10.001 (2020).

[20] Turoòová, B. et al., In situ structural analysis of SARS-COV-2 spike reveals flexibility mediated by three hinges. *Science* 370, 203-208, doi:10.1126/science.abd5223 (2020).

[21] Ke, Z. et al., Structures and distributions of SARS-COV-2 spike proteins on intact virions. *Nature* 588, 498-502, doi:10.1038/s41586-020-2665-2 (2020).

[22] Dent, S. & Neuman, B. W., Purification of coronavirus virions for Cryo-EM and proteomic analysis. *Methods Mol Biol* 1282, 99-108, doi:10.1007/978-1-4939-2438-7_10 (2015).

[23] Neuman, B. W., Adair, B. D., Yeager, M. & Buchmeier, M. J., Purification and electron cryomicroscopy of coronavirus particles. *Methods Mol Biol* 454, 129-136, doi:10.1007/978-1-59745-181-9_12 (2008).

[24] Staton, S. J. R., Chen, K. P., Taylor, T. J., Pacheco, J. R. & Hayes, M. A., Characterization of particle capture in a sawtooth patterned insulating electrokinetic microfluidic device. *Electrophoresis* 31, 3634-3641 (2010).

[25] Pysher, M. D. & Hayes, M. A., Electrophoretic and dielectrophoretic field gradient technique for separating bioparticles. *Analytical Chemistry* 79, 4552-4557 (2007).

[26] Jones, P. V. et al., Biophysical separation of Staphylococcus epidermidis strains based on antibiotic resistance. *Analyst* 140, 5152-5161, DOI:5110.1039/C5155AN00906E (2015).

[27] Ding, J., Lawrence, R. M., Jones, P. V., Hogue, B. G. & Hayes, M. A. Concentration of Sindbis virus with optimized gradient insulator-based dielectrophoresis. *Analyst* 141, 1997-2008, doi:10.1039/c5an02430g (2016).

The citation of any document is not to be construed as an admission that it is prior art with respect to the present invention.

Thus, the present invention provides systems and methods for non-destructive isolation, concentration, and/or detection of one or more analytes.

In light of the principles and example embodiments described and illustrated herein, it will be recognized that the example embodiments can be modified in arrangement and detail without departing from such principles. Also, the foregoing discussion has focused on particular embodiments, but other configurations are also contemplated. In particular, even though expressions such as "in one embodiment", "in other embodiments", "in some embodiments", or the like are used herein, these phrases are meant to generally reference embodiment possibilities, and are not intended to limit the invention to particular embodiment configurations. As used herein, these terms may reference the same or different embodiments that are combinable into other embodiments. As a rule, any embodiment referenced herein is freely combinable with any one or more of the other embodiments referenced herein, and any number of features of different embodiments are combinable with one another, unless indicated otherwise.

Although the invention has been described in considerable detail with reference to certain embodiments, one skilled in the art will appreciate that the present invention can be used in alternative embodiments to those described, which have been presented for purposes of illustration and not of limitation. Therefore, the scope of the appended claims should not be limited to the description of the embodiments contained herein.

We claim:

1. A system comprising:

an insulator-based dielectrophoresis device comprising:

(i) a fluid flow channel having at least one fluid inlet and at least one fluid outlet, (ii) at least one insulating flow structure positioned in the fluid flow channel that defines a constriction;

(iii) electrodes in electrical communication with the at least one fluid channel inlet and the at least one fluid outlet of the fluid flow channel, wherein the electrodes are positioned to generate a spatially non-uniform electric field across the insulating flow structure of the fluid flow channel to exert a dielectrophoretic force on one or more analytes suspended in the fluid within the fluid flow channel;

(iv) a power supply connected to each of the electrodes to generate an electric field within the fluid flow channel;

a light source having an output beam path configured to irradiate the one or more analytes in the fluid flow channel;

an optical device comprising at least one photon detector configured to acquire light scattered or emitted by the one or more analytes;

a processor in electrical communication with the power supply, the light source, and the optical device, the processor programmed to:

apply, using the power supply, a voltage to the electrodes sufficient to separate the one or more analytes in the fluid flow channel and capture at least a portion of the one or more analytes at a trapping zone within the fluid flow channel;

irradiate, using the light source, the one or more analytes in the trapping zone with light from the light source;

detect, using the optical device, light scattered or emitted by the one or more analytes in the trapping zone and generate a measurement indicative of the one or more analytes, wherein the fluid flow channel of the insulator-based dielectrophoresis device defines a first axis, the fluid flow channel extending from the at least one fluid inlet of the fluid flow channel to the at least one fluid outlet of the fluid flow channel, and the output beam path of the light source defines a second axis, and wherein the first axis and the second axis are perpendicular.

2. The system of claim 1, wherein the one or more analytes is selected from micro-organisms, amino acids, peptides, proteins, glycoproteins, nucleotides, nucleic acid molecules, carbohydrates, lipids, lectins, cells, viruses, viral particles, bacteria, organelles, spores, protozoa, yeasts, molds, fungi, pollens, diatoms, toxins, biotoxins, hormones, steroids, immunoglobulins, antibodies, supramolecular assemblies, ligand, quantum dots, extracellular vesicles, and combinations thereof.

3. The system of claim 1, wherein the one or more analytes have an average diameter from 10 to 250 nanometers.

4. The system of claim 1, wherein the one or more analytes comprises quantum dots.

5. The system of claim 1, wherein the light source includes a laser.

6. The system of claim 1, wherein the at least one photon-detector includes a camera, wherein the camera is a charge-coupled device (CCD) detector or a complementary metal-oxide-semiconductor (CMOS) detector.

7. The system of claim 1, wherein the processor is further programmed to apply the voltage using direct current, alternating current, or a combination thereof.

8. The system of claim 1, wherein the processor is further programmed to apply a voltage using direct current to separate the one or more analytes in the fluid flow channel and capture at least a portion of the one or more analytes at a trapping zone within the fluid flow channel, wherein the voltage is at least 350 volts.

9. The system of claim 1, wherein the processor is further programmed to apply a voltage using alternating current to separate the one or more analytes in the fluid flow channel, wherein the voltage is at least 100 V.

10. The system of claim 1, wherein the measurement indicative of the one or more analytes is a concentration of the one or more analytes in the fluid flow channel.

11. The system of claim 1, wherein the measurement indicative of the one or more analytes is a particle size measurement of the one or more analytes.

12. A method comprising:

(i) transporting a fluid mixture comprising one or more analytes through a system comprising:

an insulator-based dielectrophoresis device comprising:

(a) a fluid flow channel having at least one fluid inlet and at least one fluid outlet, (b) at least one insulating flow structure positioned in the fluid flow channel that defines a constriction;

(c) electrodes in electrical communication with the at least one fluid channel inlet and the at least one fluid outlet of the fluid flow channel, wherein the electrodes are positioned to generate a spatially non-uniform electric field across the insulating flow structure of the fluid flow channel to exert a dielectrophoretic force on the one or more analytes suspended in the fluid within the fluid flow channel;

a light source having an output beam path configured to irradiate the one or more analytes in the fluid flow channel;

an optical device comprising at least one photon detector configured to acquire light scattered or emitted by the one or more analytes;

a power supply connected to each of the electrodes to generate an electric field within the fluid flow channel;

(ii) applying, using the power supply, a voltage to the electrodes sufficient to separate the one or more analytes in the fluid flow channel and capture at least a portion of the one or more analytes at a trapping zone within the fluid flow channel;

(iii) irradiating, using the light source, the one or more analytes in the trapping zone with light from the light source;

(iv) detecting, using the optical device, light scattered or emitted by the one or more analytes in the trapping zone and generate a measurement indicative of the one or more analytes, wherein the fluid flow channel of the insulator-based dielectrophoresis device defines a first axis, the fluid flow channel extending from the at least one fluid inlet of the fluid flow channel to the at least one fluid outlet of the fluid flow channel, and the output beam path of the light source defines a second axis, and wherein the first axis and the second axis are perpendicular.

13. The method of claim 12, wherein the one or more analytes is selected from micro-organisms, amino acids, peptides, proteins, glycoproteins, nucleotides, nucleic acid molecules, carbohydrates, lipids, lectins, cells, viruses, viral particles, bacteria, organelles, spores, protozoa, yeasts, molds, fungi, pollens, diatoms, toxins, biotoxins, hormones, steroids, immunoglobulins, antibodies, supramolecular assemblies, ligand, quantum dots, extracellular vesicles, and combinations thereof.

14. The method of claim 12, wherein the one or more analytes have an average diameter from 10 to 250 nanometers.

15. The method of claim 12, wherein the one or more analytes comprise quantum dots.

16. The method of claim 12, wherein the one or more analytes comprise a virus.

17. The method of claim 12, wherein the voltage is applied using direct current to separate the one or more analytes in the fluid flow channel and capture at least a portion of the one or more analytes at a trapping zone within the fluid flow channel, wherein the voltage is at least 350 volts.

18. The method of claim 12, wherein the voltage is applied using alternating current to separate the one or more analytes in the fluid flow channel, wherein the voltage is at least 100 V.

19. The method of claim 12, wherein the measurement indicative of the one or more analytes is a concentration of the analytes in the fluid flow channel.

20. The method of claim 12, wherein the measurement indicative of the one or more analytes is a particle size measurement of the one or more analytes.

21. The system of claim 1, wherein the light source is positioned on a first side of the flow channel and both electrodes are positioned on an opposite second side of the flow channel.

22. The method of claim 12, wherein the light source is positioned on a first side of the flow channel and both electrodes are positioned on an opposite second side of the flow channel.

* * * * *